US008679694B2

(12) United States Patent
Zimmermann et al.

(10) Patent No.: US 8,679,694 B2
(45) Date of Patent: Mar. 25, 2014

(54) FLUIDIC CONTROL SYSTEM AND METHOD OF MANUFACTURE

(75) Inventors: Joerg Zimmermann, Vancouver (CA); Jean-Louis Iaconis, Burnaby (CA); Duhane Lam, Vancouver (CA); Jeremy Schrooten, Mission (CA); Gerard F. McLean, West Vancouver (CA)

(73) Assignee: Societe Bic, Clichy Cedex (FR)

( * ) Notice: Subject to any disclaimer, the term of this patent is extended or adjusted under 35 U.S.C. 154(b) by 250 days.

(21) Appl. No.: 12/053,374

(22) Filed: Mar. 21, 2008

(65) Prior Publication Data
US 2008/0233446 A1 Sep. 25, 2008

Related U.S. Application Data

(60) Provisional application No. 60/919,473, filed on Mar. 21, 2007.

(51) Int. Cl.
*H01M 8/04* (2006.01)
*F16K 31/12* (2006.01)
*F16K 31/126* (2006.01)
*F16K 31/365* (2006.01)

(52) U.S. Cl.
USPC ........ 429/446; 429/54; 137/505; 137/505.12; 137/505.29; 137/505.38; 137/505.25; 137/505.37

(58) Field of Classification Search
None
See application file for complete search history.

(56) References Cited

U.S. PATENT DOCUMENTS

| 3,176,714 | A | * | 4/1965 | Smith et al. ............... 137/596.16 |
| 3,531,079 | A | * | 9/1970 | Greene ........................ 251/61.1 |
| 4,360,569 | A | | 11/1982 | Steyert et al. |
| 4,607,826 | A | | 8/1986 | Ron |
| 4,799,360 | A | | 1/1989 | Retallick et al. |
| 5,360,461 | A | | 11/1994 | Meinzer |
| 5,527,638 | A | | 6/1996 | Kinoshita et al. |
| 6,158,712 | A | | 12/2000 | Craig |
| 6,159,629 | A | | 12/2000 | Gibb et al. |
| 6,258,198 | B1 | | 7/2001 | Saito et al. |
| 6,267,229 | B1 | | 7/2001 | Heung |
| 6,321,791 | B1 | | 11/2001 | Chow |
| 6,431,212 | B1 | | 8/2002 | Hayenga |
| 6,518,675 | B2 | | 2/2003 | Kim et al. |
| 6,520,219 | B2 | | 2/2003 | Sapovalov et al. |
| 6,528,198 | B1 | | 3/2003 | Jones et al. |
| 6,561,208 | B1 | | 5/2003 | O'Connor et al. |
| 6,619,311 | B2 | | 9/2003 | O'Connor et al. |

(Continued)

FOREIGN PATENT DOCUMENTS

| CA | 2169826 | | 3/1995 |
| CA | 2169826 | A1 | 3/1995 |

(Continued)

OTHER PUBLICATIONS

"International Application Serial No. PCT/CA2006/000588, International Search Report mailed Sep. 5, 2006", 3 pgs.

(Continued)

*Primary Examiner* — Krishnan S Menon
(74) *Attorney, Agent, or Firm* — The H.T. Than Law Group

(57) ABSTRACT

A fluidic control system includes featured layers. The featured layers include two or more features which collectively form at least one functional component.

37 Claims, 12 Drawing Sheets

(56) References Cited

U.S. PATENT DOCUMENTS

| | | | |
|---|---|---|---|
| 6,755,211 | B1 | 6/2004 | O'Connor et al. |
| 6,756,019 | B1 | 6/2004 | Dubrow et al. |
| 6,821,666 | B2 | 11/2004 | Morse et al. |
| 6,857,449 | B1 | 2/2005 | Chow |
| 6,890,067 | B2 | 5/2005 | Hock et al. |
| 6,929,030 | B2 | 8/2005 | Unger et al. |
| 7,008,309 | B2 | 3/2006 | Strasbaugh |
| 7,168,680 | B2 | 1/2007 | Koeneman |
| 7,404,842 | B1 | 7/2008 | Wainright et al. |
| 2002/0066424 | A1* | 6/2002 | Fedorowicz et al. ...... 123/41.86 |
| 2002/0164518 | A1 | 11/2002 | Wilkinson et al. |
| 2003/0229385 | A1 | 12/2003 | Elkins |
| 2004/0065171 | A1 | 4/2004 | Hearley et al. |
| 2004/0079424 | A1 | 4/2004 | Takeda et al. |
| 2004/0119038 | A1* | 6/2004 | Crockett et al. ............ 251/63.5 |
| 2004/0137300 | A1 | 7/2004 | Gemmen et al. |
| 2005/0064256 | A1 | 3/2005 | Morse et al. |
| 2005/0072946 | A1 | 4/2005 | Studer et al. |
| 2005/0158188 | A1 | 7/2005 | Matsui et al. |
| 2005/0221147 | A1 | 10/2005 | Shioya et al. |
| 2006/0042698 | A1 | 3/2006 | Koeneman et al. |
| 2006/0108004 | A1* | 5/2006 | Nakamura .................... 137/510 |
| 2006/0237688 | A1 | 10/2006 | Zimmermann |
| 2007/0026269 | A1 | 2/2007 | Nakakubo |
| 2007/0056634 | A1 | 3/2007 | Yokoi et al. |
| 2007/0295617 | A1 | 12/2007 | Zimmermann |
| 2008/0248352 | A1 | 10/2008 | McLean et al. |

FOREIGN PATENT DOCUMENTS

| | | | |
|---|---|---|---|
| CA | 2535566 | A1 | 7/2005 |
| CN | 1133080 | A | 10/1996 |
| CN | 1623247 | A | 6/2005 |
| CN | 1726348 | A | 1/2006 |
| CN | 1867795 | A | 11/2006 |
| JP | 61-62606 | A | 3/1986 |
| JP | 2004-031199 | | 1/2004 |
| JP | 2006009961 | A | 1/2006 |
| JP | 2006153609 | A | 6/2006 |
| JP | 2007107715 | A | 4/2007 |
| JP | 2008082543 | A | 4/2008 |
| WO | WO-95/08716 | A2 | 3/1995 |
| WO | WO-03/032412 | A2 | 4/2003 |
| WO | WO-2004/036059 | A1 | 4/2004 |
| WO | WO-2005/060393 | A2 | 7/2005 |
| WO | WO-2006/111005 | A1 | 10/2006 |
| WO | WO-2008/026713 | A1 | 3/2008 |
| WO | WO-2008/026714 | A1 | 3/2008 |
| WO | WO-2008/113180 | A1 | 9/2008 |

OTHER PUBLICATIONS

"International Application Serial No. PCT/CA2006/000588, Written Opinion mailed Sep. 5, 2006", 6 pgs.

"International Application Serial No. PCT/CA2007/001129, International Search Report mailed Oct. 19, 2007", 3 pgs.

"International Application Serial No. PCT/CA2007/001129, Written Opinion mailed Oct. 19, 2007", 5 pgs.

"International Application Serial No. PCT/CA2008/000541, International Search Report mailed Jun. 23, 2008", 3 pgs.

"International Application Serial No. PCT/US2008/000541, Written Opinion mailed Jun. 23, 2008", 6 pgs.

"International Application Serial No. PCT/CA2008/000535, International Search Report mailed Jul. 21, 2008", 6 pgs.

"International Application Seriall No. PCT/CA2008/000535, Written Opinion mailed Jul. 21, 2008", 5 pgs.

Debray, A., et al., "A passive micro gas regulator for hydrogen flow control", *J. Micromech. Microeng.*, 15, (2005), S202-S209.

McLean, G. F., et al., "Fluidic Distribution System and Related Methods", U.S. Appl. No. 12/053,408, filed Mar. 21, 2008, 35 pgs.

Schmidt, W. R., et al., "Hydrogen Storage in Polymer-dispersed Metal Hydrides (PDMH)", *Proceedings of the 2001 DOE Hydrogen Program Review*, NREL/CP-470-30535,(2001), 14 pgs.

Shih, R. J., et al., "Self-supported electrodes made of $LaNi_{4.25}Al_{0.15}Co_{0.5}V_{0.1}$ and Ag or Ni hydrogenation", *International Journal of Hydrogen Enemy*, vol. 31, (2006), 176-1720.

Zimmermann, J., et al., "Interface for Flexible Fluid Enclosures", U.S. Appl. No. 12/052,829, filed Mar. 21, 2008, 21 pgs.

Zimmermann, J., "Refueling Valve for a Fuel Storage System and Method Therefore", U.S. Appl. No. 11/621,542, filed Jan. 9, 2007, 27 pgs.

Züttel, A., "Materials for hydrogen storage", *Materialstoday*, (2003), 24-33.

"Chinese Application Serial No. 200880016165.0, First Office Action mailed Sep. 13, 2010", (w/ English Translation), 22 pgs.

"U.S. Appl. No. 12/053,408, Non Final Office Action mailed Jul. 6, 2011", 8 pgs.

"U.S. Appl. No. 12/053,408, Restriction Requirement mailed May 24, 2011", 7 pgs.

"U.S. Appl. No. 12/053,408,Response filed Jun. 23, 2011 to Restriction Requirement mailed May 24, 2011", 9 pgs.

"Singapore Application serial No. 200906255-5, Written Opinion and Search Report mailed Jul. 18, 2011", 17 pgs.

"U.S. Appl. No. 12/053,408, Examiner Interview Summary mailed Oct. 24, 2011", 3 pgs.

"U.S. Appl. No. 12/053,408, Examiner Interview Summary mailed Oct. 31, 2011", 2 pgs.

"U.S. Appl. No. 12/053,408, Notice of Allowance mailed Nov. 4, 2011", 5 pgs.

"U.S. Appl. No. 12/053,408, Response filed Oct. 20, 2011 to Non Final Office Action mailed Jul. 6, 2011", 18 pgs.

Extended European Search Report issued in connection with the corresponding European Patent Application No. 08733639.2 on Apr. 23, 2012.

Machine translation of JP 2006009961.

Machine translation of JP 2008082543.

Machine translation of JP 2007107715.

* cited by examiner

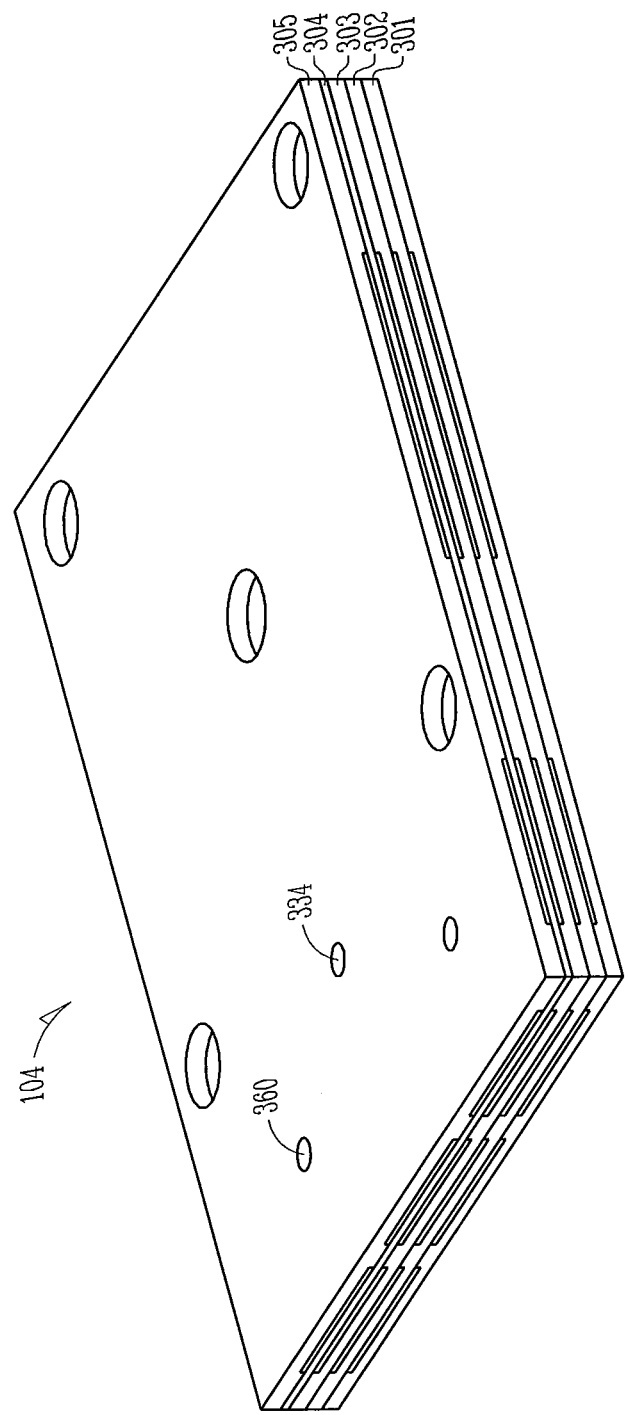

FLUIDIC CONTROL SYSTEM AND METHOD OF MANUFACTURE

TECHNICAL FIELD

The present document relates to control systems. More specifically, it relates to a fluidic control system.

BACKGROUND

Trends in technology are progressing towards smaller scales for systems in a variety of applications. Fluidic systems can be integrated within restrictive form factors imposed by the system to manipulate the transport of fluid. For example, flow-modulating components can be arranged for functions such as reactant delivery, heat transfer, and dosing of fluids.

Electronic components, such as personal electronic devices, are trending to become smaller in size. As electronic components are designed in smaller in size and incorporate sophisticated and complex technology, the demands on the power supply become greater. For instance, the power supply may need to occupy less volume or a smaller footprint to accommodate the addition of the technology to the device. The additional technology may also require that the power supply last for longer periods of time. In addition, portable electronic device may need to have energy storage maintained while the power supply shrinks.

An example of a power supply for the electronic components is a fuel cell system. In order to make a smaller fuel cell system, many individual components of the system, such as a fluid delivery component can be made smaller, but need to meet the technical requirements of the fuel cell system. For instance, the fluid delivery component may need to maintain a certain pressure, without occupying an overall significant volume of the fuel cell system, and without interfering with the assembly of the fuel cell system. Furthermore, the functionality of the fuel cell system must not be compromised.

BRIEF DESCRIPTION OF THE DRAWINGS

FIG. 7A illustrates a perspective view of a fluidic control system as constructed in accordance with at least one embodiment.

DETAILED DESCRIPTION

Figure 1A:
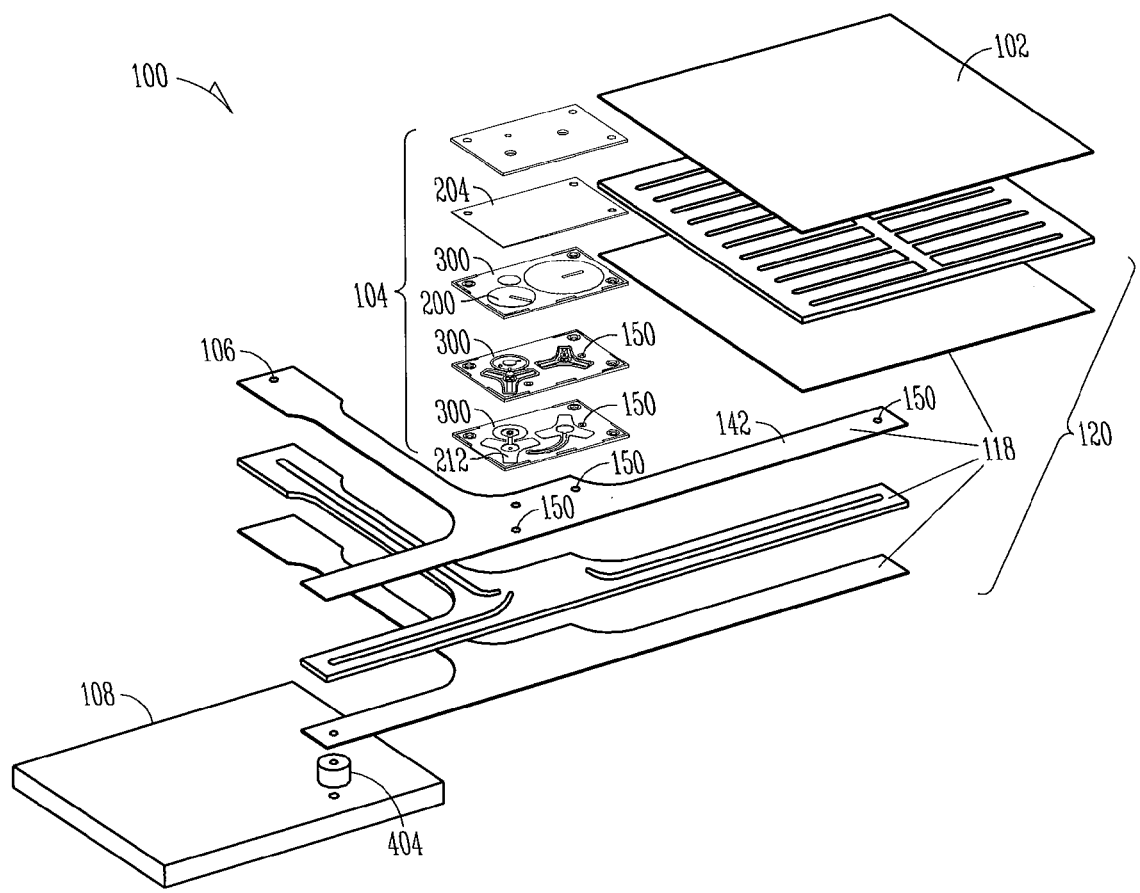
FIG. 1A illustrates an exploded view of a electrochemical cell system as constructed in accordance with at least one embodiment.

The following detailed description includes references to the accompanying drawings, which form a part of the detailed description. The drawings show, by way of illustration, specific embodiments in which the fluid manifold and fluidic control systems and methods may be practiced. These embodiments, which are also referred to herein as "examples," or "options" are described in enough detail to enable those skilled in the art to practice the present invention. The embodiments may be combined, other embodiments may be utilized or structural or logical changes may be made without departing from the scope of the invention. The following detailed description is, therefore, not to be taken in a limiting sense and the scope of the invention is defined by the appended claims and their legal equivalents.

In this document, the terms "a" or "an" are used to include one or more than one, and the term "or" is used to refer to a nonexclusive "or" unless otherwise indicated. In addition, it is to be understood that the phraseology or terminology employed herein, and not otherwise defined, is for the purpose of description only and not of limitation.

DEFINITIONS

As used herein, "fluid" refers to a continuous, amorphous substance whose molecules move freely past one another and that has the tendency to assume the shape of its container. A fluid may be a gas, liquefied gas, liquid or liquid under pressure. Examples of fluids may include fluid reactants, fuels, oxidants, and heat transfer fluids. Fluid fuels used in fuel cells may include hydrogen gas or liquid and hydrogen carriers in any suitable fluid form. Examples of fluids include air, oxygen, water, hydrogen, alcohols such as methanol and ethanol, ammonia and ammonia derivatives such as amines and hydrazine, silanes such as disilane, trisilane, disilabutane, complex metal hydride compounds such as aluminum borohydride, boranes such as diborane, hydrocarbons such as cyclohexane, carbazoles such as dodecahydro-n-ethyl carbazole, and other saturated cyclic, polycyclic hydrocarbons, saturated amino boranes such as cyclotriborazane, butane, borohydride compounds such as sodium and potassium borohydrides, and formic acid.

As used herein, "fluid enclosure" may refer to a device for storing a fluid. The fluid enclosure may store a fluid physically or chemically. For example, the fluid enclosure may chemically store a fluid in active material particles.

As used herein, "active material particles" refer to material particles capable of storing hydrogen or other fluids or to material particles that may occlude and desorb hydrogen or another fluid. Active material particles may include fluid-storing materials that occlude fluid, such as hydrogen, by chemisorption, physisorption or a combination thereof. Some hydrogen-storing materials desorb hydrogen in response to stimuli, such as change in temperature, change in heat or a change in pressure. Examples of hydrogen-storing materials that release hydrogen in response to stimuli, include metal hydrides, chemical hydrides, suitable micro-ceramics, nano-ceramics, boron nitride nanotubes, metal organic frameworks, palladium-containing materials, zeolites, silicas, aluminas, graphite, and carbon-based reversible fluid-storing materials such as suitable carbon nanotubes, carbon fibers, carbon aerogels, and activated carbon, nano-structured carbons or any combination thereof. The particles may also include a metal, a metal alloy, a metal compound capable of forming a metal hydride when in contact with hydrogen, alloys thereof or combinations thereof. The active material particles may include magnesium, lithium, aluminum, calcium, boron, carbon, silicon, transition metals, lanthanides, intermetallic compounds, solid solutions thereof, or combinations thereof.

As used herein, "metal hydrides" may include a metal, metal alloy or metal compound capable of forming a metal hydride when in contact with hydrogen. Metal hydride compounds can be generally represented as follows: $AB$, $AB_2$, $A_2B$, $AB_5$ and BCC, respectively. When bound with hydrogen, these compounds form metal hydride complexes.

As used herein, "occlude" or "occluding" or "occlusion" refers to absorbing or adsorbing and retaining a substance, such as a fluid. Hydrogen may be a fluid occluded, for example. The fluid may be occluded chemically or physically, such as by chemisorption or physisorption, for example.

As used herein, "desorb" or "desorbing" or "desorption" refers to the removal of an absorbed or adsorbed substance. Hydrogen may be removed from active material particles, for example. The hydrogen or other fluid may be bound physically or chemically, for example.

As used herein, "contacting" refers to physically, chemically, electrically touching or within sufficiently close proximity. A fluid may contact an enclosure, in which the fluid is physically forced inside the enclosure, for example.

A fluidic control system is provided herein. The fluidic control system provides an effective structure and method of controlling the distribution of fluid, for example, in a small volume of space. The fluidic control system is formed of thin layers of material, such as layers having a thickness of about 10 to 500 micron.

The fluidic control system is formed of one or more featured layers, where one or more of the layers have features. In an option, the features of the featured layers form functional components of the system. In an option, the system includes at least two functional components, where features of any of the two or more featured layers collectively form the functional components. In yet another option, functional component is formed by the interaction of features formed in two or more layers, or two to four layers, where the component function is achieved by the displacement of at least one feature out of its plane and into the plane of another featured layer. For example, the feature may be mechanically displaced orthogonal to the plane of the features.

In a further option, the functional components are co-planar with each other. In yet another option, the two or more features include an array of features fluidly communicating with each other within a common plane. Examples of the functional components for the fluidic control system include, but are not limited to, at least one of a pressure regulator component, a check valve component, a flow valve component, a charge valve component, a pressure relief component, a conduit, an on/off valve, a manual on/off valve, or a thermal relief component.

In an example embodiment, the fluidic control system, including the functional components discussed above and below, can be used with at least one fluid enclosure communicatively coupled with the fluidic control system.

In an example embodiment, the fluidic control system can be used within an electrochemical cell system, such as a fuel cell system, for instance as illustrated in FIG. 1A. Although the term fuel cell system is used herein, it should be noted that the system can be used for any electrochemical cell system. The fuel cell system 100 includes, but is not limited to, one or more of a fuel cell 102, a fluidic control system 104, a charge port 106, a fluid enclosure such as fuel reservoir 108, and a fluid manifold 120.

The fuel reservoir 108 provides fuel for the fuel cell 102, which can be charged or refueled via the charge port 106. The fluidic control system 104 provides for the distribution and regulation of fuel, as will be further described below. The fluid manifold 120 provides a conduit for the fuel between the fluidic control system 104, the fuel cell 102, and the fuel reservoir 108. The fluid manifold can also be used to distribute other fluids, including, but not limited to, heat transfer fluid.

The fluid enclosure such as a fuel reservoir, can have a variety of forms. In an option, the fluid enclosure is flexible. Furthermore, the fluid enclosure can be protected with one or more pressure relief component of the self-destructive type, such as fusible triggers, rupture disks and diaphragms, or of the re-sealable type, such as spring-loaded pressure-relief valve. A pressure relief component may be "pressure-activated", set to activate at a certain pressure. Alternately, a pressure relief component may be "thermally-activated", set to activate at a certain temperature. A pressure relief component may also be both "pressure-activated" and "thermally-activated". Still further, the fluid enclosure can be protected with a thermal relief component.

In a further option, the fluid enclosure can include fuel cartridges, such as replaceable fuel cartridges. The cartridges may include dispenser cartridges, disposable fuel ampoules, refillable fuel tanks or fuel cell cartridges, for example. The fuel cartridge may include a flexible liner that is connectable to a fuel cell or fuel cell layer. The fuel cartridge may also include a connecting valve for connecting the cartridge to a fuel cell, fuel cell layer or refilling device. Examples of valves can be found in commonly owned co-pending patent application entitled REFUELING VALVE FOR A FUEL STORAGE SYSTEM AND METHOD THEREFOR, filed on Jan. 9, 2007, having Ser. No. 11/621,542, and which is incorporated by reference in its entirety.

In a further option, the fluid enclosure can be used in a system with an interface. The system optionally includes a strain absorbing interface for contacting the fluid enclosure. For instance, the interface is used for a rigid or semi-rigid component and a flexible fluid enclosure. The interface absorbs any strain due to dimensional changes in the fluid enclosure as it charges with hydrogen. Additional examples and details can be found in commonly owned co-pending patent application entitled INTERFACE FOR FLEXIBLE FLUID ENCLOSURES, filed even date herewith, having Ser. No. 12/052,829 and patented as U.S. Pat. No. 7,926,650, and which is incorporated by reference in its entirety.

Rigid components, such as mounts or fluidic devices for fuel cell communication, can be coupled to the fluid enclosure through the flexible interface and not risk sheering due to mechanical stress. The flexible interface allows for more component configurations and applications for use with a flexible fluid enclosure. The flexible interface absorbs strain and supports the connection between component and enclosure.

Figure 10:
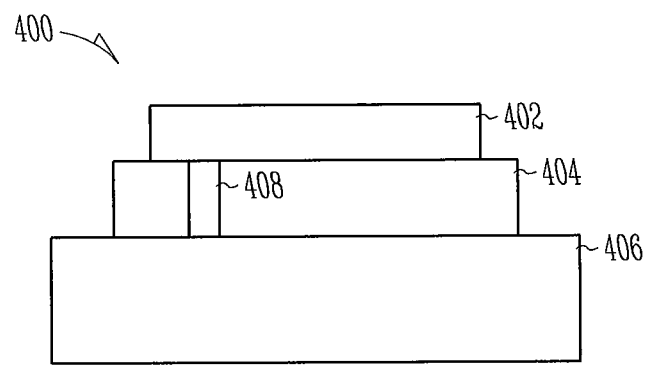
FIG. 10 illustrates a view of an enclosure with an interface as constructed in accordance with at least one embodiment.

For instance, referring to FIG. 10, a cross-sectional view of a fluid enclosure interface system 400 is shown, according to some embodiments. The system 400 includes a flexible fluid enclosure 406 in contact with a strain absorbing interface 404 on a first side. On a second side, the interface 404 may be in contact with a featured layer 402. The featured layer may include a plurality of featured layers, or one or more featured layers that collectively form a functional component. An optional fluidic connection 408 may be positioned in the interface 404, connecting the enclosure 406 and featured layer 402.

The fluid enclosure 406 may be an enclosure formed by conformably coupling an outer wall to a composite hydrogen storage material, for example. Conformably coupled refers to forming a bond that is substantially uniform between two components and are attached in such as way as to chemically or physically bind in a corresponding shape or form. A structural filler or composite hydrogen storage material may be conformably coupled to an outer enclosure wall, for example, in which the outer enclosure wall chemically or physically binds to the structural filler or composite hydrogen storage material and takes its shape. The outer enclosure wall is the outermost layer within a fluid enclosure that serves to at least partially slow the diffusion of a fluid from the enclosure. The outer enclosure wall may include multiple layers of the same or differing materials. The outer enclosure wall may include a polymer or a metal, for example. The fluid may be hydrogen, for example. Additional examples and details regarding the enclosure can be found in commonly owned co-pending entitled FLUID ENCLOSURE AND METHODS RELATED THERETO, filed Jun. 23, 2006, having Ser. No. 11/473,591, and which is incorporated by reference in its entirety.

A composite hydrogen storage material refers to active material particles mixed with a binder, wherein the binder immobilizes the active material particles sufficient to maintain relative spatial relationships between the active material particles. Active material particles are material particles capable of storing hydrogen or material particles that may occlude and desorb hydrogen, such as metal hydrides, for example. The active material may be a metal, metal alloy or metal compound capable of forming a metal hydride when in contact with hydrogen. For example, the active material may also include a metal, a metal alloy, a metal compound capable of forming a metal hydride when in contact with hydrogen, alloys thereof or combinations thereof. The active material particles may include magnesium, lithium, aluminum, calcium, boron, carbon, silicon, transition metals, lanthanides, intermetallic compounds, solid solutions thereof, or combinations thereof.

The active material particles may occlude hydrogen by chemisorption, physisorption or a combination thereof. Active material particles may also include silicas, aluminas, zeolites, graphite, activated carbons, nano-structured carbons, micro-ceramics, nano-ceramics, boron nitride nanotubes, palladium-containing materials or combinations thereof. Examples of composite hydrogen storage materials can be found in commonly-owned U.S. patent application Ser. No. 11/379,970, filed Apr. 24, 2006, which is incorporated by reference.

The strain absorbing interface 404 may be manufactured of any suitable material that allows it to be flexible, absorb strain and bond to the enclosure 406 and featured layer 402. The material chosen should provide a suitable bond, physical or chemical, between the featured layer 402 and enclosure 406 and also allow for the differential in strain between the strain of the enclosure wall and the rigidity of the featured layer 402, so that the sheer stress on any bonds does not exceed the strength of such bonds. The interface 404 may be manufactured of an elastomeric material or silicon material, for example. Elastomeric materials may include thermoplastic elastomers, polyurethane thermoplastic elastomers, polyamides, melt processable rubber, thermoplastic vulcanizate, synthetic rubber and natural rubber, for example. Examples of synthetic rubber materials may include nitrile rubber, fluoroelastomers such as Viton® rubber (available from E.I. DuPont de Nemours, a Delaware corporation), ethylene propylene diene monomer rubber (EPDM rubber), styrene butadiene rubber (SBR), and Fluorocarbon rubber (FKM).

Figure 11:
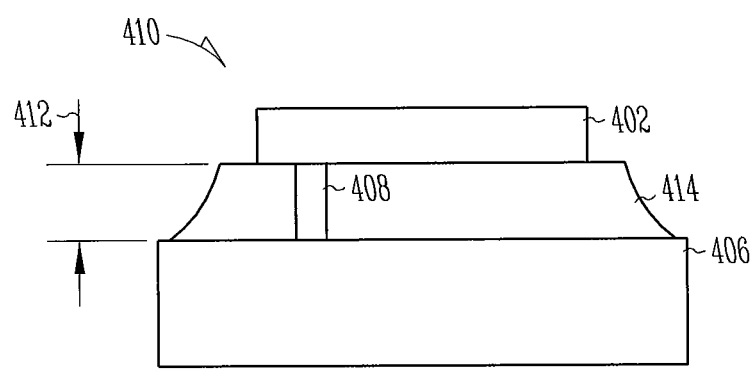
FIG. 11 illustrates a side view of an enclosure with an interface as constructed in accordance with at least one embodiment.

As the fluid enclosure 406 is filled with fluid, or occluded by a composite fluid storage material, the dimensions of the enclosure 406 increase (see FIG. 11). The strain absorbing interface 406 may deform or change in dimension, such as in thickness 412. The strained interface 414 then maintains a consistent, less stressful contact between the enclosure 406 and featured layer 402. The featured layer 402 would then undergo little to no strain, as the interface 414 absorbs strain caused by the enclosure 406 movements. The interface 414 may absorb all or at least part of the strain caused by changes in dimension of enclosure 406.

The featured layer 402 may be any fitting, mount, connector, valve, regulator, pressure relief component, planar microfluidic device, a plate, any device that might control the flow of hydrogen into or out of the enclosure or combinations thereof, for example. Multiple interfaces 404 and multiple featured layers 402 may be utilized in conjunction with one or more fluid enclosures 406, where the featured layers form functional components such as, but not limited to, the fluidic control system, the manifold, the pressure regulator, the check valve. In another option, the interfaces 404 can be coupled with an inlet of the fluidic control system, the fuel cell, or the fluidic enclosure.

Figure 1B:
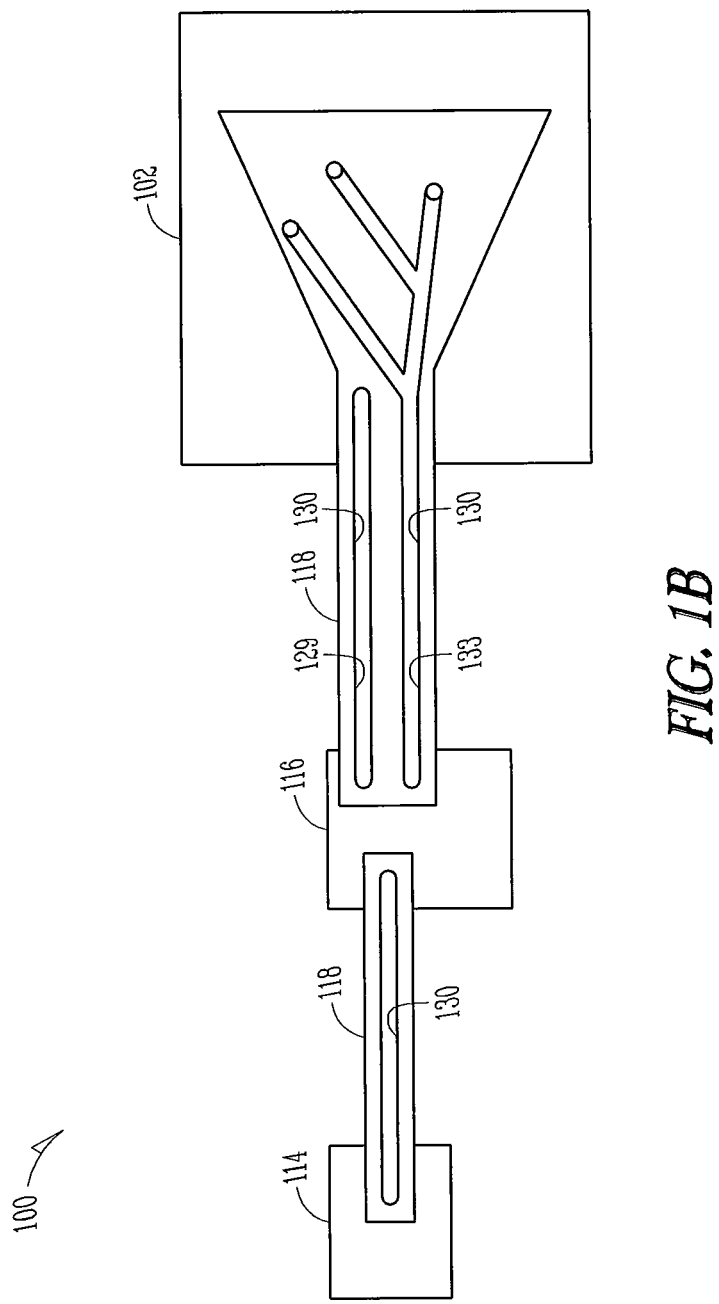
FIG. 1B illustrates a block diagram of a electrochemical cell system in accordance with at least one embodiment.

FIG. 1B illustrates additional examples for the system 100 and the manifold 118. The fuel cell system 100 includes a fluid enclosure 114 fluidly coupled with one or more fluid control components, by a manifold 118. The one or more fluid control components can include, but are not limited to a fluidic control system, at least one of a pressure regulator component, a check valve component, a flow valve component, a charge valve component, a pressure relief component, a conduit, an on/off valve, a manual on/off valve, or a thermal relief component.

The one or more fluid control components, such as the pressure regulator component 116, is fluidly coupled with a fuel cell 102 via a manifold 118. The manifold 118 includes one or more conduit channels 130 therein. In a further option, the manifold 118 is fluidly coupled with the one or more fluid control components, such as the pressure regulator 116, and is fluidly coupled with the fuel cell 102, and can further include at least one feedback channel 129 and a delivery channel 133. The delivery channel 133 delivers fluid such as a fuel to the fuel cell 102. The feedback channel 129 allows for the regulator to be piloted based on the feedback to the pressure regulator 116 from pressure in the fuel plenum, and is fluidly coupled to a fluid plenum of the fuel cell system. Each of the components of the fuel cell system 100 can be formed by the flexible layered structured as discussed above and below. In a further option, the one or more conduit channels 130 include a gas conduit channel, or a feedback channel.

Further options for the system 100 are as follows. For instance, a component for a fluidic control system, includes two or more featured layers having features. The features include a valve having a position, and a fluid flow through the functional component is controllable based on the position of the valve. The system further includes a flexible feature that is actuatable in response to a sensory fluid pressure, where a position of the flexible feature proportionally controls the valve position. The flexible feature optionally has elastic properties. The flexible feature, in an option, is integrated with a second pressure plenum. In a further option, the flexible feature restricts flow through the fluidic control system component between a predefined range of sensory fluid pressures. In yet a further option, a spring member is in contact with the flexible feature.

Sensory fluid pressure, in an option, refers to any pressure that controls the valve position. The sensory fluid pressure can include a pressure upstream or downstream of the valve, a pressure of a fluid plenum such as a fuel plenum of a fuel cell, environmental pressure, any other pressure within the system, pressure differentials, and combinations thereof. The sensory fluid pressure, in an option, includes a pressure downstream of the valve. In another option, the sensory fluid pressure includes a pressure in the low pressure plenum, and/or the sensory fluid pressure includes a pressure in the high pressure plenum. In yet a further option, the sensory fluid pressure is a fluid pressure of a fluidic plenum of at least one fuel cell.

The features of the featured layers optionally include at least two fluid plenums including a first pressure plenum and a second pressure plenum, where optionally the first pressure plenum is a high pressure plenum receiving unregulated fluid, and the second pressure plenum is a low pressure plenum receiving regulated fluid. Alternately, the first pressure plenum may be a high pressure plenum receiving regulated fluid, and the second pressure plenum may be a low pressure plenum receiving unregulated fluid. In an option, a position of the flexible feature proportionally controls the position of the valve, and controls a flow of fluid between the first pressure plenum and the second pressure plenum. Further options for multiple plenums are as follows.

Figure 12:
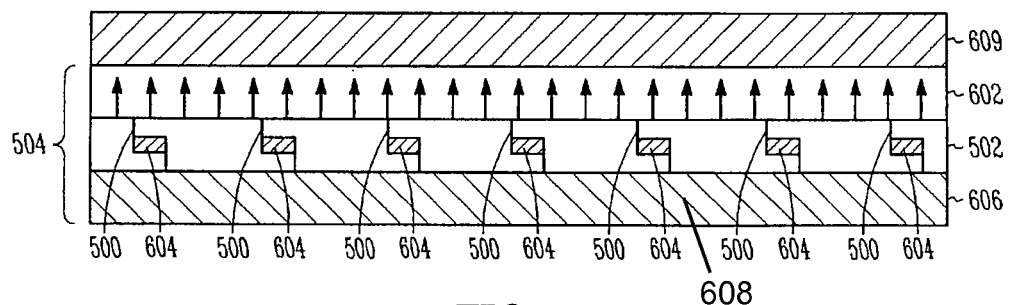
FIG. 12 illustrates a cross-sectional view of a electrochemical cell system in accordance with at least one embodiment.

As shown in cross-section in the example of FIG. 12, a fuel cell layer 602 is arranged to one side of a dual system plenum 504, including a higher pressure fluid reservoir 608 and a lower pressure anode cavity 609 separated by the array 502 of fluidic pressure regulator devices 604. In one example, the dual system plenum 504 has approximately the same dimensions as the fuel cell layer 602, with the fuel cell layer 602 in direct fluidic communication with the anode cavity 609.

In operation, fuel or other fluid is allowed to enter the higher pressure fluid reservoir 608 via a charge port or inlet 606. Optionally, there may be a fluidic pressure regulator device or other fluid control element at such inlet. This allows for high fuel or other fluid pressures, such as pressures exceeding 30 psi, to exist in the fluid reservoir 608 as these high pressures are not allowed to exert a significant force on the anodes of the fuel cell layer 602 due to the array of fluidic pressure regulator devices 604. This means an overall bulk fuel distribution system may be employed, allowing for easy circulation of fuel or other fluid within the fluid reservoir 608 and avoiding the possibility of having local starvation of fuel or other powering fluid. Optionally, multiple fluid reservoirs may be connected to a common inlet so that multiple fuel cell layers can be operated as a single system. This allows each fuel cell layer to be individually pressure regulated, eliminating the need for pressure distribution management and allowing for an alternative method of constructing multiple fuel cell layer assemblies.

Figure 13:
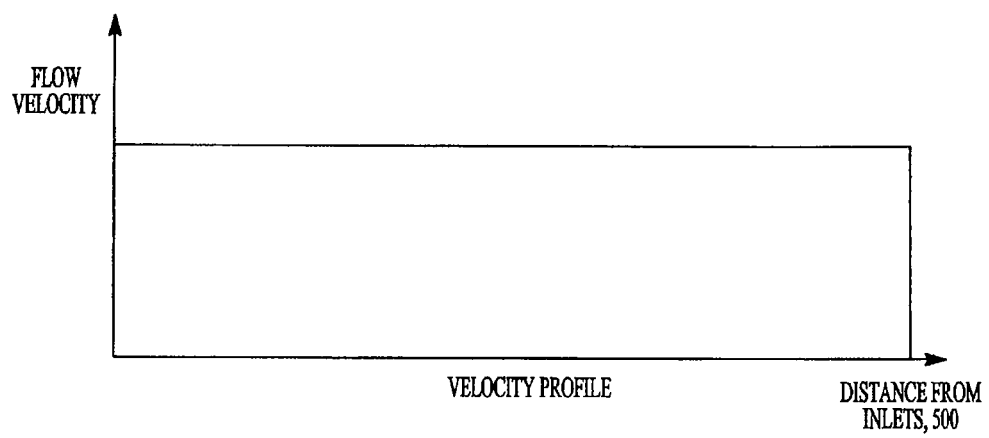
FIG. 13 illustrates a fuel flow velocity within the electrochemical cell system of FIG. 12, which includes an array of fluidic pressure regulator devices and an array of anode cavity inlets, as constructed in accordance with at least one embodiment.

When multiple inlets to the anode cavity 609 from the low pressure outlets 500 of the array 502 of fluidic pressure regulator devices 604 are employed, such as in a parallel configuration, there is advantageously a fluid (e.g., fuel) flow velocity that is uniform or nearly uniform along a length and width of the fuel cell layer 602, as shown in FIG. 13.

Referring again to FIG. 1A, the fluid manifold 120 is fluidly coupled with the fluidic control system 104 and the fuel reservoir 108, and/or the fuel cell 102, for example as discussed in co-pending provisional application entitled "FUEL MANIFOLD AND METHODS THEREFOR", filed Mar. 21, 2007, having Ser. No. 60/919,472 and, in co-pending application entitled "FLUID MANIFOLD AND METHODS THEREFOR", filed even date herewith, and are each incorporated herein by reference in its entirety.

In an example, the fluid manifold 120 includes a layered structure that allows for the manifold to be of a size that does not take up unnecessary volume, nor an unnecessarily large footprint, yet allows for the pressure, volume, and temperature requirements for fuel supply systems to be met. The fluid manifold 120 can be made of relatively thin layers of material, allowing for the fluid manifold 120 to be flexible. The flexible manifold can be bent around components, or wrapped around components, providing greater number of assembly options for the fuel cell system. In a further option, the fluid manifold 120 can be made as part of the fluidic control system 104.

Figure 2:
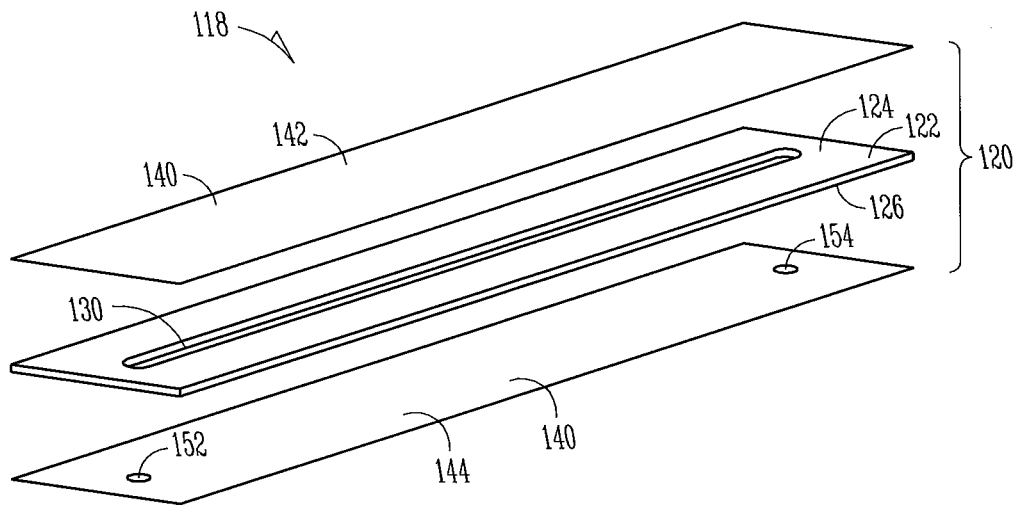
FIG. 2 illustrates an exploded perspective view of a fluid manifold as constructed in accordance with at least one embodiment.

FIG. 2 illustrates an example of a portion of a fluid manifold, such as the fluid manifold 120. This portion of the fluid manifold 120 includes at least one conduit layer 122 defined in part by a first side 124 and a second side 126. In an option, the at least one conduit layer 122 is relatively thin, for example, compared with the length and width. In an example, the thickness of the at least one conduit layer 122 is about generally less than 1 mm. In another example, the thickness of the at least one conduit layer 122 is about 50 µm-1 mm. In an example, the width and length of the layer 122 is about 1 mm and 100 mm, respectively. In another example, the thickness of the at least one conduit layer 122 is about 100 µm, and the width and length of the layer 122 is about 1 mm and 1.5 mm, respectively. The width and/or the length can be altered for geometry of the system in which the manifold is installed.

In a further option, the thickness of the layer is about 10-500 micron, and a dimension of the conduit channel, such as a height or a width or a channel depth, is about 50 micron to 1 mm. The layer is highly planar such that a width of the manifold is greater than thirty times the dimension of the conduit channel. In another option, the width of the manifold is greater than three times the dimension of the conduit channel. It should be noted other ranges are possible.

Figure 3A:
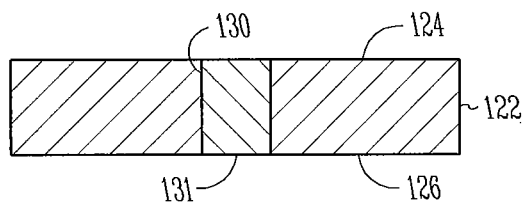
FIG. 3A illustrates a cross-sectional view of a conduit layer as constructed in accordance with at least one embodiment.
Figure 3B:
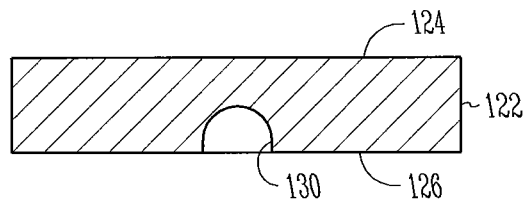
FIG. 3B illustrates a cross-sectional view of a conduit layer as constructed in accordance with at least one embodiment.

The at least one conduit layer 122 further includes at least one recess 130 therein. The at least one recess 130 is a material directing recess in that it directs the material that flows therethrough. The at least one recess 130, in an option, extends through the conduit layer 122, from the first side 124 to the second side 126, as shown in FIG. 2, and FIG. 3A. In another option, the at least one recess 130 extends only partially within a side of the conduit layer 122, as shown in FIG. 3B. In yet another option, the conduit layer 122 includes two or more recesses 130. For example, two or more recesses 130 which extend from the first side 124 to the second side 126 can be disposed within the conduit layer 122. The two or more recesses 130 can include recesses that extend partially within a side of the conduit layer 122 (FIG. 3B) and/or the recesses 130 can extend through the layer 122 (i.e. from the first side 124 and through the second side 126).

The two or more recesses 130 can be formed within the conduit layer 122 such that they do not intersect with one another in the conduit layer 122. Alternatively, the two of more recesses 130 can be formed within the conduit layer 122 such that they do intersect with one another in the conduit layer 122. The recess 130 extends along the conduit layer 122, and allows for material such as fuel to flow therethrough.

Figure 3C:
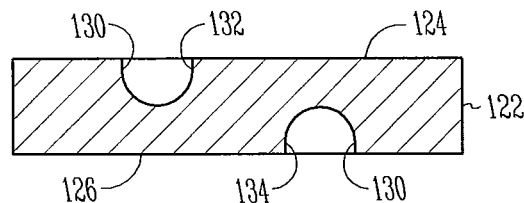
FIG. 3C illustrates a cross-sectional view of a conduit layer as constructed in accordance with at least one embodiment.

In another option, a first recess 132 can be formed on the first side 124 of the conduit layer 122, and a second recess 134 can be formed on the second side 126 of the conduit layer 122, where the first recess 132 and the second recess 134 do not necessarily extend from the first side 124 through to the second side 126. In an example shown in FIG. 3C, the partial recesses 136 are disposed on opposite sides of the conduit layer 122, allowing for material to travel therethrough via the recesses on the first side 124 and the second side 126.

The conduit layer 122, in another option, is formed of one or more of metals, plastics, elastomers, or composites, alone or in combination. The at least one recess 130 is formed within and/or through the layer 122, in an option. For example, the at least one recess 130 can be etched or stamped within and/or through the layer 122. In another option, the at least one recess 130 can be drilled within and/or through the layer, formed with a laser, molded in the layer 122, die cutting the layer 122, or machined within and/or through the layer 122. In an option, the at least one recess 130 has a width of about 20× the depth of the recess. In another option, the at least one recess 130 has a width of about 1 mm-2 mm. In yet another option, the at least one recess has a width of about 50-100 μm.

The fluid manifold 120 further optionally includes at least one barrier layer, and/or a sealing layer 140, as shown in FIG. 2. In a further option, the fluid manifold 120 includes a first sealing layer 142 and a second sealing layer 144 disposed on opposite sides of the conduit layer 122. For example, the first sealing layer 142 abuts and seals against the first side 124 of the conduit layer 122, and the second sealing layer 144 abuts and seals against the second side 126 of the conduit layer 122. This allows for the recess 130 to be enclosed and form a conduit through which material travels. The sealing layers 142, 144 can be coupled with the conduit layer 122, for example, but not limited to, using adhesives, bonding techniques, or laser welding. In a further option, the sealing layers 142, 144 and the conduit layer 122 are sealed together. For example, the layers 122, 142, 144 are coupled together through thermal bonding, adhesive bonding, gluing, soldering, welding, ultrasonic welding, diffusion bonding, heat sealing, etc. In a further option, layers 122, 142, 144 are joined by gluing with cyano acrylate adhesive. In yet another option, layers 122, 142, 144 could be built up and selectively etched as is done for MEMs and integrated circuits.

The layers 122, 142, 144, in an option, include one or more bonding regions 369 allowing for flowing adhesives or other bonding agents so that layers can be bonded without the functional components, the conduit channels, or ports also being bonded. In a further option, the one or more featured layers include barrier features, such as, but not limited to, physical barriers such as ridges, or recesses and/or chemical barriers that separate bonding regions from functional regions and/or prevent bonding material from entering function regions.

In a further option, one or more of the sealing layers 142, 144 includes one or more ports 150 therein. For example, the one or more ports 150 can include an inlet 152 and an outlet 154. The inlet and outlet 152, 154 are positioned within the sealing layer 144 such that they are fluidly coupled with the recess 130. Material such as fluid fuel can travel in through the inlet 152, through the recess 130, and out of the outlet 154. The one or more ports 150 provide fluid communication between the manifold 120 and components to which the manifold 120 is coupled, such as, but not limited to, the fuel reservoir 108 (FIG. 1A) or the fuel cell 102 (FIG. 1A). It should be noted that it is possible to use the manifold 120 as a fluid distribution system where there is a single inlet and multiple outlets so that the manifold 120 feeds multiple locations. For example, the manifold 120 could be used as a hydrogen distribution with a single inlet and multiple outlets so that the manifold 120 feeds multiple locations on a fuel cell layer.

In a further option, a filter element 131 can be incorporated into a part of the flow path. For example, the filter element 131 can be disposed within the recess 130, as shown in FIG. 3A. In another option, the filter element 131 can be disposed within the ports 150, such as the inlet 152. The filter element 131 can include a porous substrate or a flow constricting element. In another option, the filter element 131 can define the recess 130. The filter element 131 disposed within the recess 130 and/or the ports 150 assists in preventing collapsing of the recess 130 and/or port 150 for instance, when the fluid manifold 120 is bent around itself or other components within the fuel cell system. For example, two or more recesses 130 which extend from the first side 124 to the second side 126 can be disposed within the conduit layer 122. The two or more recesses 130 can be formed within the conduit layer 122 such that they do not intersect with one another in the conduit layer 122. Alternatively, the two of more recesses 130 can be formed within the conduit layer 122 such that they do interest with one another in the conduit layer 122. The recess 130 extends along the conduit layer 122, and allows for material such as fluid to flow therethrough.

Referring again to FIG. 1A, the fluidic control system 104 includes a layered structure that has one or more featured layers. The featured layers 300 each include features thereon and/or therein. In an option, the featured layers 300 are sealed with one another, for example, with a gas-tight seal. The term "gas-tight" may be understood to refer to a bond that is impermeable to a fluid. For example, the bond may be substantially impermeable to hydrogen at or below 340 psi or 2.5 MPa.

The features provide one or more portions of a functional component of the fluidic control system 104. When the featured layers 300 are disposed adjacent to one another, features on one layer are brought together with features of another layer, either physically, functionally, or both and the portions of functional components brought together form one or more functional components for the fluid control system 104. For example, a first portion of a first component is formed on a first featured layer, and a second portion of the first component is formed on a second featured layer. The first featured layer and the second featured layer are brought together, for example, but not limited to, by stacking the first and second featured layers, and the first portion and the second portion are brought together to form a functional first component.

The fluidic control system 104 can include one or more different functional components such as, but not limited to, at least one pressure regulator component 200, check valve component 230, or flow valve component formed of features of one or more featured layers 300. The features can be on a single featured layer to collectively form a functional component. In another option, the features can be on multiple featured layers to collectively form a functional component. When multiple featured layers 300 are used to form the functional component, it is possible to build multiple function components into a single assembly of multiple featured layers. For instance, if a first component is formed on three featured layers, a second or third component requiring three or less featured layers can be formed on the same featured layers, albeit remote from the features of the first functional component.

Figure 4:
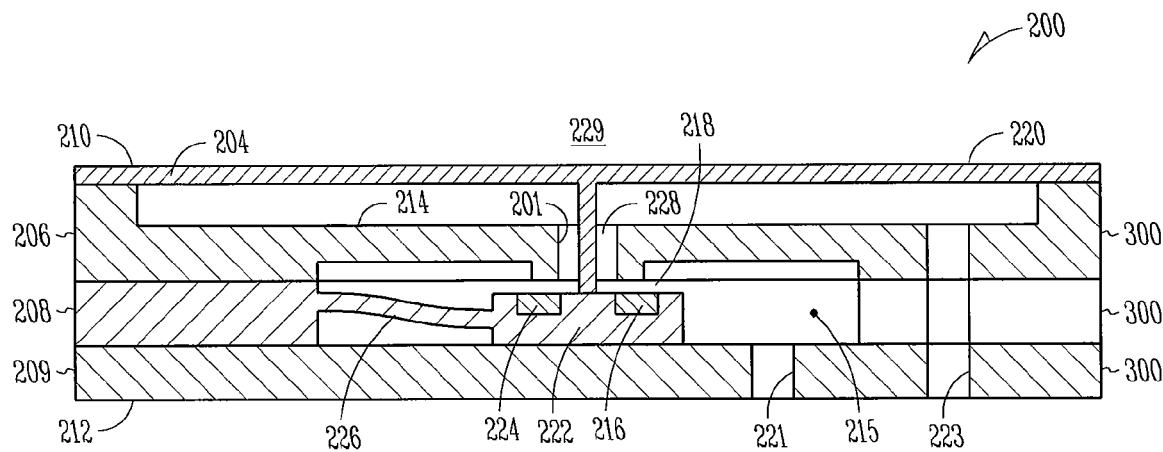
FIG. 4 illustrates a cross-sectional view of a pressure regulator as constructed in accordance with at least one embodiment.

An example of a functional component is a pressure regulator component 200, for instance as shown in more detail in FIG. 4. The pressure regulator component 200 is formed, in an option, on multiple featured layers 300, where features on each layer 300 provide a portion of the pressure regulator component 200. In an example, the featured layers 300 includes, but is not limited to, one or more of a first layer 204, a second layer 206, a third layer 208, or a fourth layer 209. The second layer 206 is disposed between the first layer 204 and the third layer 208, and the third layer 208 is disposed between the second layer 206 and the fourth layer 209. It should be noted that fewer or more than four layers can be used for the pressure regulator component 200. The layers can be formed of relatively thin sheets of material. Suitable materials include, but are not limited to, metal, elastomeric material, plastic rubber, copper, copper beryllium alloy, aluminum, stainless steel, acrylic, silicon, olefins, epoxies, polyester, brass, polyvinylidenefluoride (PVDF), hexafluoropropylene vinyldyne fluoride copolymer or combinations thereof.

The pressure regulator component 200 is defined in part by a first side 210 and a second side 212. In an option, the first layer 204 forms the first side 210, and the fourth layer 209 forms the second side 212. The first side 210 and/or the second side 212, in an option, can be configured to cooperatively interact with adjacent components of the fuel cell system. For example, the faces can be used to interface to planar fluid distribution manifolds, or face seals can be placed around the outlet 221 etc.

The first, second, third, and fourth layers 204, 206, 208, 209 correspond to featured layers of the fluidic control system 104. It should be noted that although FIG. 4 illustrates a single pressure regulator component 200 formed of features of the featured layers, it is contemplated that multiple regulators can be formed on the same layers, resulting in co-planar regulators. For instance, at least one primary pressure regulator component and one or more secondary regulators can be formed on the same layers. The pressure regulator component 200 can further include a switch, such as valve 209 of FIG. 9, allowing for the operation of the fluidic control system 104 to switch between using the primary pressure regulator component to using the primary pressure regulator component and one or more secondary regulators. The use of the thin sheets or layers to make the primary pressure regulator components and secondary pressure regulator components allow for multiple regulators to be fabricated at the same time, and further allow for the output pressure of the regulators to be set, and can be set, at least in part, on the relative size of the first layer 204, the thickness of the layer, the elasticity of the layer, a flexibility of the layer, or combinations thereof.

The pressure regulator component 200 has a high pressure inlet 221 and a low pressure outlet 223. The layered structure of the pressure regulator component 200 allows for the outlet pressure to be regulated while the inlet pressure can vary. Referring again to the first layer 204, it can serve a number of functions, and includes a number of features thereon. For instance, it provides a diaphragm 220 and a cap to a low pressure plenum 214 for the pressure regulator component 200, where the low pressure plenum 214 is formed between the first layer 204 and the second layer 206. The first layer 204 is formed, in one option, of elastically deformable material, and further optionally actuates the regulator valve 216 through the actuation member 228 via the elastically deformable material. Suitable materials include, but are not limited to, elastomeric material, plastic rubber, copper, copper beryllium alloy, aluminum, stainless steel, brass, or combinations thereof. In another option, actuation of the regulator valve 216 can be varied via a thickness of the layer 204, for example, where layer 204 is an elastic component. The first layer 204 further provides an elastic spring force to counteract the force from pressure in the low pressure plenum 214. In an option, elastic stiffness of the first layer 204 determines the output pressure of the regulator. The pressure regulator component 200 further includes an actuation member 228, where the actuation member 228 is disposed through an opening 201 of the second layer 206.

The actuation member 228 provides a contact between the valve 216 and the elastically deformable material of the first layer 204. In an example, the actuation member 228 includes a member that is disposed between the valve 216 and the first layer 204, or the member can be integral with the first layer 204, or formed on or as part of the first layer 204. In another option, the actuation member 228 can be formed integrally or as part of layer 208. In an option, the actuation member 228 includes a sphere or a ball (FIG. 7C) disposed between the first layer 204 and the valve 216. In another option, the actuation member 228 includes a projection disposed between the first layer 204 and the valve 216. When pressure in the low pressure plenum 214 drops below the desired output pressure of the regulator, the diaphragm 220 of the first layer 204 presses against the actuation member 228, such as the ball (FIG. 7C), and the actuation member opens the valve 216.

Several options for the actuation member 228 are possible. For instance, in an option, the actuator can be made integral with one of the diaphragm 220. In another option, the actuator can be formed of a spring member, such as, but not limited to a leaf spring. The leaf spring optionally cantilevers, and forms the actuator. In another option, a spring member is disposed adjacent the sealing valve. In another option, the actuator can include shape memory alloy material, allowing for further options for actuation of the actuator. In yet another option, the actuator is a layer having a pinch shape, providing a projection therefrom. The shape can also be a ball member, or other shapes. In another option, compressible material, including, but not limited to, a spring, is disposed on a bottom layer, such as the fourth layer 209, and optionally in the relaxed position places the valve in a sealing position.

Referring to the second layer 206, the second layer 206 includes a number of features such as a portion of the low pressure plenum 214, and separates the low pressure plenum 214 from the high pressure plenum 215. In yet another option, the second layer 206 further provides a sealing seat 218 for the regulator valve 216. The third layer 208 defines a portion of the high pressure plenum 215, in further cooperation with the second layer 206 and the fourth layer 209. The third layer 208 further includes the regulator valve 216.

The regulator valve 216 seals the opening 201 within the regulator 200. In an option, the valve 216 is formed within layer 208, such that the valve 216 is integral with the layer 208 without the need for additional, discrete components. In another option, the valve 216 formed with the layer 208 can also serve as the actuation member 228. In a further option, the valve 216 includes a body 222, a seal 224, and a spring member 226. The body 222 has a seal 224 therein, for example, that is molded therein. The body 222 is coupled with the spring member 226, for example a cantilever spring, which allows for the valve 216 to be moved from the closed position to the open position, and from the open position to the closed position. The spring member 226 can be formed for example by etching, stamping, laser cutting, die cutting, deposition, printing, machining, molding, and/or electroforming the member in the layer allowing for a spring-like attachment within layer 208. Other options for the spring member 226 include, but are not limited to, a deformable member such as a ball, an elastomeric or deflectable region on layer 209, a member, such as a deformable member below the valve 216, or as part of layer 209.

The spring member 226 and the valve 216 are disposed within the high pressure plenum 215. A fourth layer 209 of the regulator 200 is disposed adjacent to the third layer, and caps the outer portion of the valve 216, for example the bottom of the valve 216, and optionally provides an inlet 221 and an outlet 223 for the regulator 200. The inlet 221 is fluidly connected with the high pressure plenum 215, and the outlet is fluid connected with the low pressure plenum 214, for instance, through ports disposed within the second layer 206 and the third layer 208.

In an example operation of the pressure regulator component 200, fluid, such as fuel, enters the inlet 221 and fluid from the inlet 221 pressurizes the high pressure plenum 215. The fluid further passes through the open regulator valve 216 into the low pressure plenum 214. The valve 216 is open due to the low pressure in the low pressure plenum. As the low pressure plenum 214 increases in pressure, first layer 204 is deflected toward 229 until the actuation member 228 pulls free from the regulator valve 216, closing the valve 216 against the seat 218, and limiting pressure in the low pressure plenum 214. Pressure in the low pressure plenum 214 drops as fluid in the low pressure plenum 214 drains through the outlet port 223. This causes the first layer 204 to deflect away from 229, causing the actuation member to reopen the regulator valve 220 and start the cycle over again.

Figure 5:
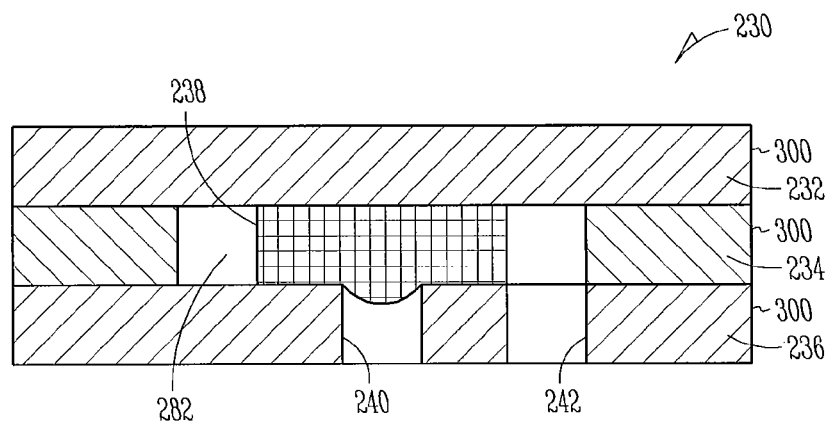
FIG. 5 illustrates a cross-sectional view of a check valve component as constructed in accordance with at least one embodiment.

As mentioned above, the fuel system 104 includes one or more micro planar fluidic components, including, but not limited to a pressure regulator component 200 and check valve component. The check valve component can be used for filling a fuel reservoir. FIG. 5 illustrates a cross section of an example of a check valve component 230 having one or more featured layers 300. For instance, the featured layers of the check valve component 230 includes three layers, such as a first layer 232, a second layer 234, and a third layer 236, where the second layer 234 is disposed between the first layer 232 and the third layer 236. It should be noted that the featured layers of the check valve component 230 can be formed on the same featured layers of the other fluidic control components, including, but not limited to the pressure regulator component, the manifold, etc.

The first layer 232, in an option, provides a cap to the check valve component 230. The second layer 234 includes an elastomeric member 238, and the third layer 236 has an inlet port 240 and an outlet port 242 therein. It should be noted the inlet port 240 and the outlet port 242 can be formed on different featured layers. The elastomeric member 238 is compressed against the inlet port 240, and seals the inlet port 240. In an option, the elastomeric member 238 is formed as a feature in layer 234. In another option, the elastomeric member 238 is a separate component inserted in to a featured formed in layer 234. In yet another embodiment, the elastomeric member 238 includes the entire layer.

Layers 232, 234 and 236 are made from one or more of materials including, but not limited to metal, elastomeric material, plastic rubber, copper, copper beryllium alloy, aluminum, silicon, stainless steel, acrylic, olefins, epoxies, polyester, brass, PVDF, hexafluoropropylene vinyldyne fluoride copolymer or combinations thereof. and are optionally formed by etching, stamping, laser cutting, die cutting, deposition, printing, machining, molding, or electroforming. Layer 234 can be formed, for example by molding or etching material from elastomeric material. Layer 238 is less rigid than layers 232 and 236 so that pressurized fuel can deform layer 238 away from the inlet 240.

During filling of a reservoir, such as a fuel reservoir, pressurized fluid such as fuel is applied to the inlet port 240 of the check valve component 230. For example, in filling the reservoir, the fluid manifold interacts with or can be coupled to the fuel cell or other system components using adhesives working over comparatively large surface areas to that the force due to internal fluidic pressures that is forcing the components apart is easily overcome by the strength of the adhesive bond. A high internal pressure can be counteracted with a bond that has a relatively low tensile strength.

In filling the reservoir, devices for detachably coupling, such as a pressure activated valve, can be used. For example, pressure activated one-way valve allows a flow of fluid, for example, fluid fuel, into the fluid enclosure for a fuel storage system. The flow of fuel is allowed into the fluid reservoir during refueling, but does not allow fuel to flow back out of the fuel reservoir. In an option, flow of fuel is permitted to flow back out of the fluid reservoir if the fluid reservoir is over pressurized with fuel.

An external refueling device can form a seal against a portion of the sealing surface, for example, around the inlet port with a seal, such as an o-ring or gasket. Fuel is introduced into the fluid control system, and the fluidic pressure of the fuel compresses the compressible member and breaks the seal between the compressible member and the outside cover. In another option, an environment surrounding the exterior of the outside cover may be pressurized with fuel to force fuel through the refueling valve assembly and into the fuel reservoir.

When the fueling process is complete, the refueling fixture is removed from the valve assembly, and the valve becomes closed. For example, the compressible member decompresses, and fluidic pressure from the fuel reservoir through the fuel outlet port exerts pressure on to the compressible member and presses the compressible member against the outside cover. The decompression of the compressible member and/or the fluid pressure from the reservoir creates a seal between the compressible member and the outside cover such that fuel does not flow past the compressible member and into the fuel inlet port. In another option, the compressible member and/or the fluid diffusion member can be designed to intentionally fail if the pressure in the fuel reservoir becomes too great, or greater than a predetermine amount.

In another option, a fluid coupling assembly can be used to couple the system with another component. The coupling assembly includes a first coupling member, a second coupling member, and a seal member therebetween. The first coupling member and the second coupling member are magnetically engagable, such as by way of a first magnetic member and a second magnetic member having attracted polarities. The engagement of the first coupling member and the second coupling member opens a fluid flow path therebetween. When the coupling members are disengaged, this fluid flow path is sealed. Additional examples and details can be found in commonly owned co-pending entitled MAGNETIC FLUID COUPLING ASSEMBLIES AND METHODS, filed Nov. 7, 2007, having Ser. No. 11/936,662, which is incorporated by reference in its entirety.

Referring again to FIG. 5, pressure from the fluid deflects the elastomeric member 238 allowing fluid to pass by the member 238 and into the valve plenum 282 that surrounds at least a portion of the member 238. Fluid optionally travels from the plenum 282, through the outlet port 242, and directed toward a reservoir, for example, through a manifold 120 (FIG. 1A). When the source of the pressurized fluid is removed from the inlet port 240, the elastomeric member 238 seats again against the inlet port 240, and prevents fuel from flowing back out through the inlet port 240. In an option, the check valve component 230 is coupled with a fluid manifold, for example, along the third layer 236.

Figure 6:
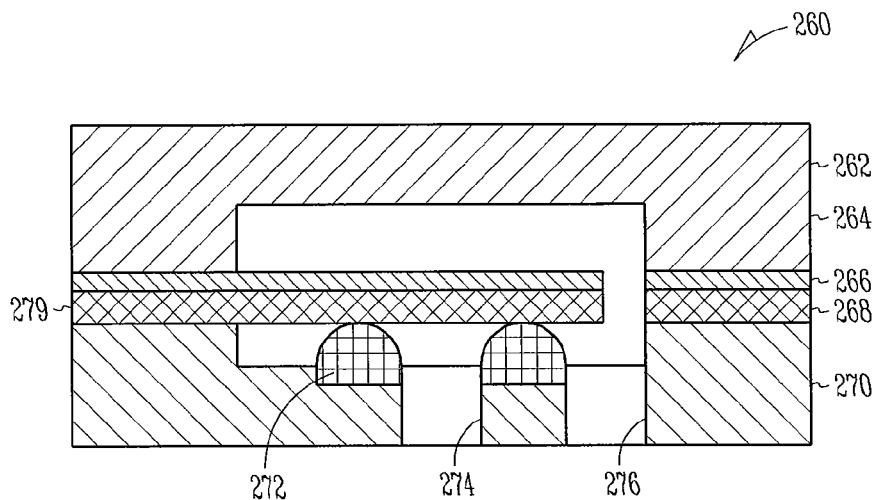
FIG. 6 illustrates a cross-sectional view of a flow valve component as constructed in accordance with at least one embodiment.

The fluidic control system 104 (FIG. 1A) further includes one or more flow valve components for example, to shut off fuel, and/or to direct the fuel through the system. The flow valve component is formed on a number of featured layers, where the featured layers have features. Similar to the check valve component, the flow valve component can be formed on the same featured layers of the pressure regulator component and/or the check valve component. The flow valve component can be actuated using a mechanical actuation, or a chemical actuation. In another option, the flow valve component can be actuated using electrical actuation. FIG. 6 illustrates an example of an electrically actuated flow valve component 260 that has one or more layers 262 therein. In an option, the flow valve component 260 includes a first layer 264, a second layer 266, a third layer 268, and a fourth layer 270. The first layer 264 provides a cap for the flow valve component 260. The second layer 266, in an option, includes features to activate open and closed states for a feature on an adjacent layer. For instance, the second layer 266 includes a printed resistive circuit layer. The second layer 266 can be used to control the opening and closing of the flow valve component 260. The third layer 268 provides actuation for open and closed states, and is, for example, formed of shape memory alloy, and can be triggered by the second layer 266, for example. The fourth layer 270 provides a valve seat 272, inlet and outlet ports 274, 276, and a base 278 for optional attachment to a fluid manifold 120 (FIG. 1A). In an open state, energy such as heat is applied to the actuator 279, and the actuator 279 is moved away from the valve seat 272. For example, electrical current flowing through a resistive layer can be used to heat the shape memory alloy, allowing for the actuator 279 to curve up and away from the valve seat 272. In the closed state, the actuator 279 is pressed against the valve seat 272, and seals the valve seat 272. For instance, the shape memory alloy is allowed to cool, and return to an undeformed state to press against the valve seat 272.

The fluidic control system 104 is formed of featured layers 300 that interact with one another, and includes a number of components formed as a result of the interaction of the layers 300. The components of the fluidic control system 104, including, but not limited to, at least one or more of a pressure regulator component, a check valve component, or a flow valve component are each formed on one or more featured layers 300, and may share featured layers 300. For example, features of the pressure regulator component may be on the same featured layer 300 as the at least one check valve component and/or the flow valve component.

Figure 7B:
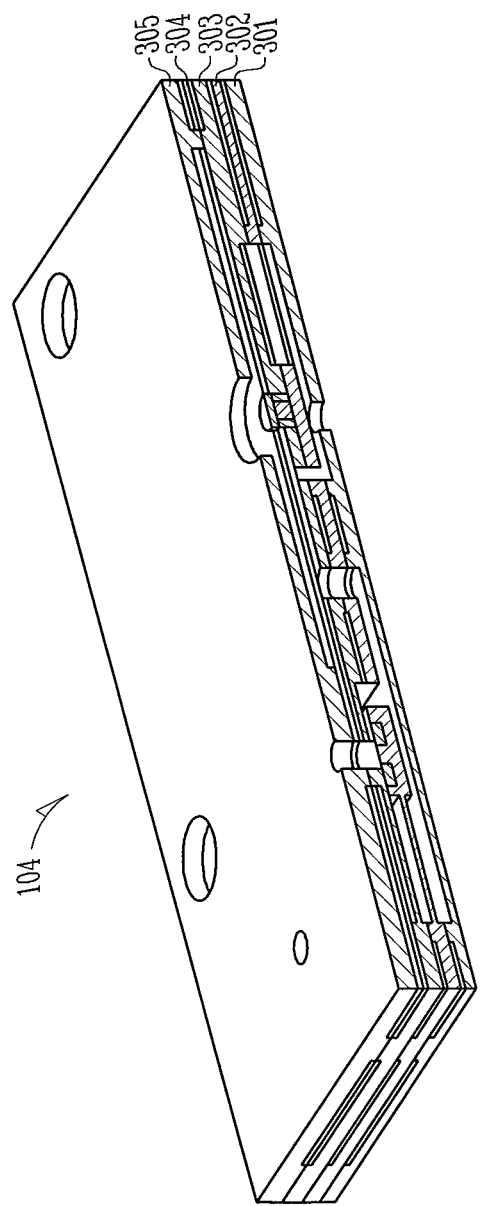
FIG. 7B illustrates a cross-sectional perspective view of a fluidic control system as constructed in accordance with at least one embodiment.
Figure 7C:
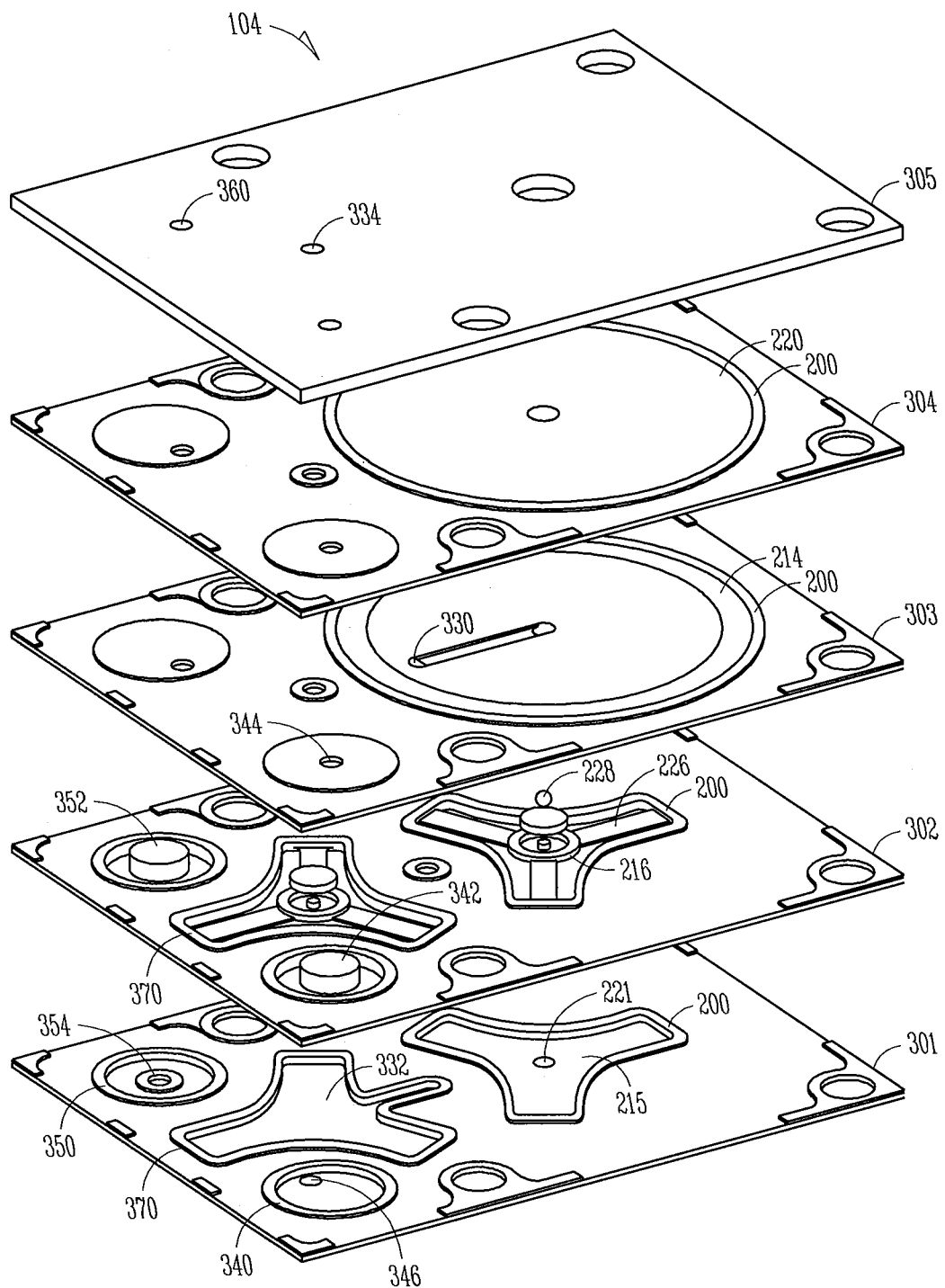
FIG. 7C illustrates an exploded perspective view of a fluidic control system as constructed in accordance with at least one embodiment.

FIGS. 7A, 7B, and 7C illustrates an example of the fluidic control system 104 with featured layers 300, for example featured layers 301, 302, 303, 304, and 305, each having features. The fluidic control system 104 includes at least one of the following components: a pressure regulator component 200, the flow valve component 260, a charge valve component 340, or a pressure relief component 322. It should be noted that one or more of the components can be included, and are optionally co-planar with each other.

The featured layers 300 form compound structures providing for integrated fluidic circuits that include layers with multiple features stacked and joined together. The features of the featured layers 300 collectively form functional components. The layers can be mounted on an external manifold, or the manifold can also be integrated as part of the layered structure. For example, portions of the layered structure can continue through multiple layers forming a conduit through the layers, and can interface with components such as fuel reservoir and the fuel cell.

The layers can be formed and assembled as an array of parts held together on a larger sheet. The layers are made with various processes such as, but not limited to, etching, stamping, laser cutting die cutting, deposition, printing, machining, molding or electroforming, allowing for ease of manufacture of a large number of components. For example, sub systems can be assembled at the same time, and then removed from an array of several of the same or similar sub systems. Multiple components can be built next to each other on the same layer. Furthermore, multiple assemblies of components can be built concurrently from the same sheet of material forming the layer, and then cut out to make individual fluid systems. The layers can be held and sealed together for example, but not limited to, using one or more of the following techniques: gluing, adhesive bonding, thermal bonding, diffusion boding, welding, or soldering. The layers in an option, include one or more bonding regions allowing for flowing adhesives or other bonding agents so that layers can be bonded without the functional components, the conduit channels, or ports also being bonded. In a further option, the one or more featured layers include barrier features, such as, but not limited to, physical barriers such as ridges, or recesses and/or chemical barriers that separate bonding regions from functional regions and/or prevent bonding material from entering function regions.

The layered structure is made small, nano-fabrication technologies, and/or micro fabrication technologies can be employed to produce and assemble the layers. For instance, processes for producing and/or assembling the layers include, but are not limited to, microfluics application processes, or chemical vapor deposition for forming a mask, and followed by a process such as etching. In addition, materials for use in fabricating the thin layered structure includes, but is not limited to, silicon, polydimethylsiloxane, parylene, or combinations thereof.

The layers are small and planar. For example, the thickness of the layer is about 10-500 micron. The layer is highly planar such that a width of a planar portion of the layer is greater than thirty times the thickness of the layer. In another option, the width of the layer is greater than three times the thickness of the layer. It should be noted other ranges are possible.

When the layers are placed adjacent to one another, the layers are adapted to operatively interact together. It should be noted that one or more of the components can be replaced with an array of smaller components. For example, an individual regulator can be replaced with a regulator component array. The regulator array may provide a failure tolerant system, as some of the array may fail to function, and yet the overall system can continue to operate. It further addresses the ability to distribute fuel in an effective way, for instance the regulator array can be distributed in the fuel cell or fuel reservoir to reduce issues caused by poor fuel distribution.

One example of the components formed by the featured layers includes a pressure regulator component 200. Features which form portions of the pressure regulator component 200 are formed on layers 301, 302, 303, and 304. For example, at least a portion of the high pressure plenum is formed on layer 301, at least a portion of the valve 216 is formed on layer 302, at least a portion of the low pressure plenum 214 is formed on layer 303, and the diaphragm 220 is formed on layer 304. The features are formed on the various layers 301, 302, 303, and 304, and the layers are brought together, for example, the layers are disposed adjacent to one another, and are optionally joined. The features interact with features on the same or other featured layers and collectively form a functional component, such as the pressure regulator component 200. Other components can be formed on the various layers, including layers 301, 302, 303, and 304 such that features of one component share a layer with features of another component, as further discussed below. For example, the features and resulting functional components are co-planar.

During operation of the fluidic control system 104, fluid such as fuel enters the regulator 200 through an inlet port 221 and enters the high pressure plenum 215. The high pressure plenum 215 surrounds the regulator valve 216 and spring member 226, such as three elastic members, hold the valve 216 closed against the valve seat unless the valve is acted upon by the actuation member 228, such as the actuator ball. When the pressure in the low pressure plenum 214 is below the designed output pressure of the regulator, the diaphragm 220 presses against the actuation member 228, which in turn opens the regulator valve 216. When the valve 216 is in the open position, fluid such as fuel can flow from the high pressure plenum 215 to the low pressure plenum 214 until the desired pressure is reached and the diaphragm 220 deflects enough to allow the regulator valve 216 to close.

The fluid leaves the regulator 200 through an opening 330 and enters the flow valve plenum 332 of the flow valve component 370. The flow valve component has features on different featured layers that collectively form a functional component, such as the flow valve component. The flow valve component, in this example, is similar to the regulator valve 216. However, rather than being actuated upon by an actuation member 228 as in the regulator valve 216, the flow valve component is opened with a pin pressed against the flow valve component through the outlet port 334. The outlet port 334 can be connected to a fuel cell 102 (FIG. 1A), for example, via a manifold 120 (FIG. 1A).

The charge valve component 340 is another component having features formed on one or more featured layers 300 that interact and collectively form a functional component, as shown in FIG. 7C. The charge valve component 340 includes a spring member 342 of featured layer 302, such as a rubber member, pressed sealingly against the charge port 344 of featured layer 303. When charging pressure is applied to the charge port 344, the spring member 342 is deformed away from the charge port 344 by the charge pressure allowing gas to flow by and enter the port 346 of featured layer 301. The port 346 is optionally fluidly connected to the fuel reservoir 108 (FIG. 1A).

Another component that can be made using a number of different featured layers 300 includes a pressure relief component 340. The pressure relief component 350 includes a spring member 352 of featured layer 302, such as a rubber member, that seals against a port 354 of featured layer 301. The port 354 is fluidly connected to the fuel reservoir 108 (FIG. 1A) and when the reservoir pressure is exceeds a predetermined value, the spring member 352 is deformed away from the port 354 by the pressure in fuel reservoir 108. This allows for fluid such as fuel to flow by, pass through ports formed by featured layers 303, 304, and enter the port 360 of featured layer 305, which exhausts to the atmosphere. In an option, the regulator 200, the charge valve component 340, and the pressure relief component 350 communicate with the fuel reservoir 108 separately through ports 221, 346, 354. In another option, an additional manifold layer below layer 301 can be added, and the ports can be combined into fewer ports, such as one port.

Figure 8A:
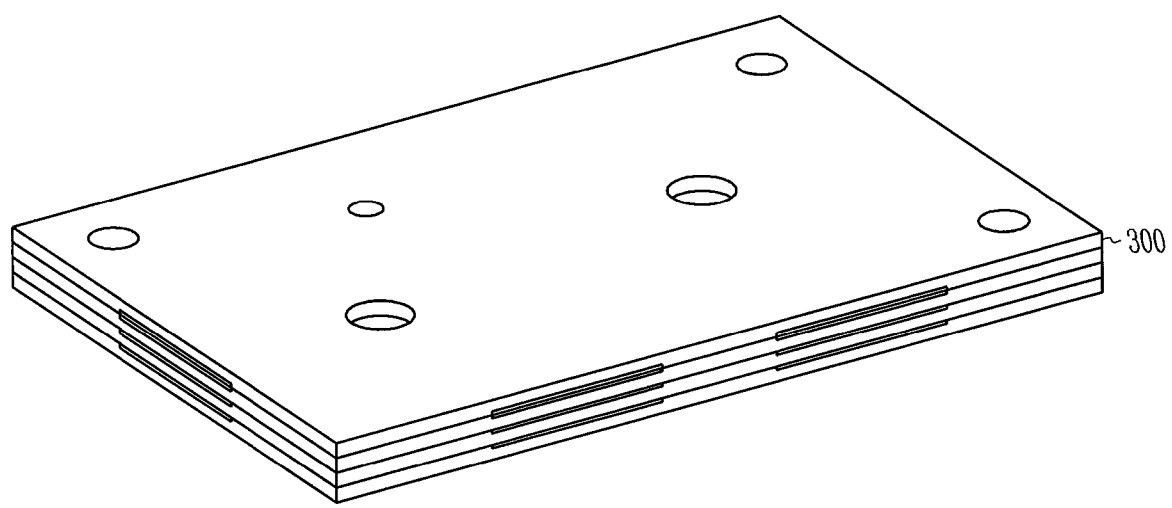
FIG. 8A illustrates a perspective view of a fluidic control system as constructed in accordance with at least one embodiment.
Figure 8B:
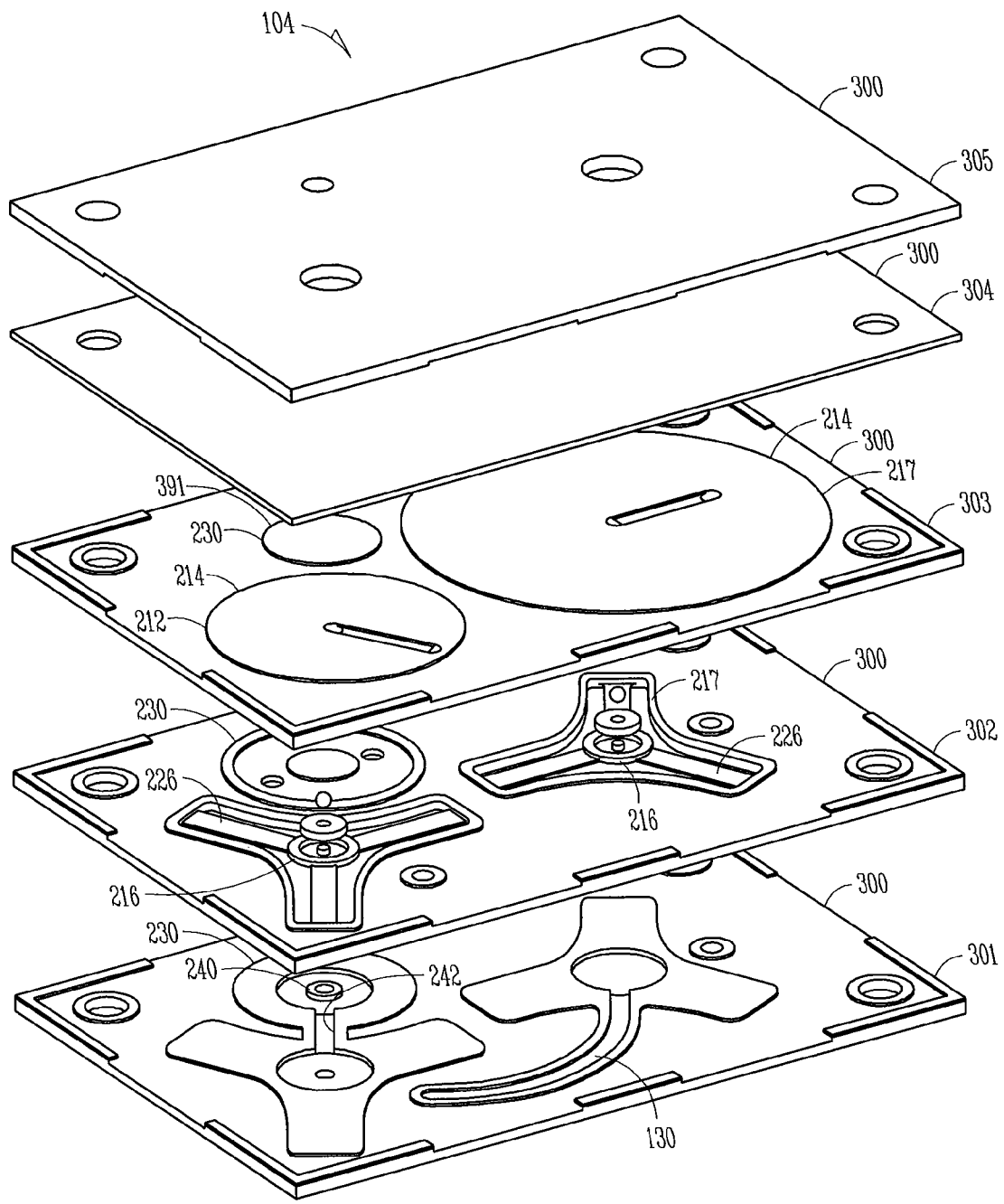
FIG. 8B illustrates an exploded perspective view of a fluidic control system as constructed in accordance with at least one embodiment.

FIGS. 8A and 8B illustrate an example of the fluidic control system 104 formed of featured layers 300 including features. The featured layers 300 can be formed by various techniques, such as, but not limited to etching, etching, stamping, laser cutting, die cutting, deposition, printing, machining, molding, or electroforming, etc. An array of features can be formed on each featured layer, and an array of functional components can be formed by bringing the layers together. In an example, a second featured layer is stacked on the first featured layers, and the array of functional components is formed. Optionally, the second featured layer is joined with the first featured layer with various techniques such as, but not limited to, thermal bonding, adhesive boding, soldering, welding, ultrasonic welding, diffusion bonding, heat sealing, etc.

The featured layers 300 include features therein or thereon which form portions of a component of the fluidic control system. Examples of components of the fluidic control system 104 include a check valve component 230, a primary regulator 213 and at least one secondary regulator 217.

The primary and secondary regulators 213, 217 have similar structure, in an option. Features which form portions of the pressure regulator components 213, 217 are formed on layers 301, 302, 303, and 304. For example, at least a portion of the high pressure plenum is formed on layer 301, at least a portion of the valve 216 and member 226 are formed on layer 302, at least a portion of the low pressure plenum 214 is formed on layer 303, and the diaphragm 220 is formed on layer 304. The features are formed on the various layers 301, 302, 303, and 304, and the layers are brought together, for example, the layers are disposed adjacent to one another, and are optionally joined. The features interact with features on other featured layers and collectively form a functional component, such as the pressure regulator components 213, 217. The pressure regulator components 213, 217 are optionally co-planar.

The check valve component 230 is formed of features formed on, in or disposed on multiple featured layers 300. The check valve component 230 can be used for fueling a fuel reservoir of the fuel cell. Featured layer 303, in an option, provides a cap 391 to the check valve component 230. The featured layer 302 includes an elastomeric member, and the third featured layer 301 has an inlet port 240 and an outlet port 242 therein. It should be noted the inlet port 240 and the outlet port 242 can be formed on different featured layers. The elastomeric member is compressed against the inlet port 240, and seals the inlet port 240.

During filling of a fluid, for example fueling of a fuel cell, pressurized fluid such as fuel is applied to the inlet port 240 of the check valve component 230. The pressure from the fluid deflects the elastomeric member allowing fluid to pass by the member and into the valve plenum that surrounds at least a portion of the member. Fluid optionally travels from the plenum, through the outlet port 242, and directed toward a reservoir, for example, through a manifold 120 (FIG. 1A). When filling is complete, the elastomeric member seats against the inlet port 240, and prevents fluid from flowing back out through the inlet port 240. In an option, the check valve component 230 is coupled with a fluid manifold, for example, along the featured layer 301.

Figure 9:
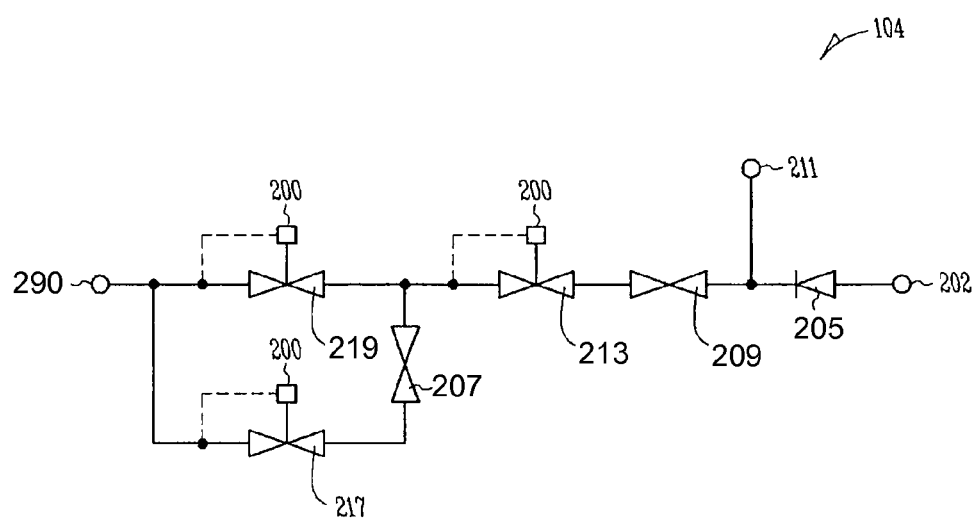
FIG. 9 illustrates a system configuration for a fluidic control system as constructed in accordance with at least one embodiment.

Referring to FIG. 9, a system layout of a fluidic control system 104 is illustrated. In an option, the fluidic control system 104 includes one or more of a fuel refueling inlet 202, a check valve component 205, a pressure selection valve 207, an on/off valve 209, and/or an outlet 290, for example, to the fuel cell 102 (FIG. 1A). The on/off valve 209 turns off the fuel supply if the fuel cell system is turned off. The fuel system 104 further optionally includes a connection 211 to fuel reservoir 108 (FIG. 1A).

The fluidic control system 104 optionally includes at least one pressure regulator component 200. In an example, the at least one pressure regulator component 200 includes at least one primary pressure regulator component 213. In a further option, the at least one pressure regulator component 200 includes at least one primary pressure regulator component 213 and/or at least one secondary pressure regulator component 217. In an option, the fluidic control system 104, includes multiple pressure regulator components 200 such as multiple secondary pressure regulator components 217, or an array of secondary pressure regulator components 217 alone or in combination with the primary pressure regulator component.

When the fuel cell fed by the system is able to tolerate wide variations in inlet pressure, or when the difference between the fluid storage pressure, such as fuel storage pressure, and the demanded delivery pressure is low, a primary pressure regulator component, such as a single, primary pressure regulator component, may be used. When the fuel cell fed by the system is unable to tolerate wide variations in pressure, the system 104 can be configured with both primary and secondary regulators.

The primary pressure regulator component 213 steps the pressure down for the secondary pressure regulator component 217. Further, the primary pressure regulator component 213 reduces the effect of fluctuating fuel reservoir pressure on the output of the secondary pressure regulator components 217. The primary pressure regulator component 213 and the secondary pressure regulator component 217, and/or the two or more secondary pressure regulator components 217 can be set to different output pressures. In this configuration, one of the regulators can provide a lower pressure for when the fuel cell is in standby operation, while another can provide a higher pressure when the fuel cell is actively operating. This option can be extended to include multiple pressures tuned to support a wide range of operating modes of the fuel cells, including the modulation of pressures for ancillary fuel cell management functions such as gas purging, water management etc. Using multiple secondary pressure regulator components allows for digital selection of the operating pressures, and eliminates a need for a continuously variable pressure regulation system.

In an option, the pressure selection valve 207 controls flow to the higher pressure secondary regulator 217 and controls the pressure of the linked output of the multiple secondary regulators 217. If the pressure selection valve 207 is off, the output of the secondary pressure regulator components 217 is at the lower pressure, while if the valve 207 is open, the output will be at the higher pressure. In an option, one or both of the secondary regulators 217 are pilot pressure controlled from the fuel pressure at the fuel cell 102 (FIG. 1A). This allows for the fuel pressure at the fuel cell to remain constant, unaffected by pressure losses in the fuel conduits between the regulators 200 and the fuel cell 102 (FIG. 1A). See also commonly owned co-pending patent application entitled FLUIDIC DISTRIBUTION SYSTEM AND RELATED METHODS, filed even date herewith, having Ser. No. 12/053,408 and patented as U.S. Pat. No. 8,133,629, and, which is incorporated by reference in its entirety.

As mentioned above, two or more secondary regulators 217 can be included in the fluidic control system 104. For example, an array of parallel secondary regulators 217 with each having its own pressure selection valve would enable digital pressure control where the pressure can be increased and decreased in increments. The regulators 217 in the array would each have differing output pressure.

The fuel cell pressure is easily fed back through the conduit back to the physical location of the pressure regulator components. Additionally, the unregulated gas pressure can be used to provide mechanical power into the system for actuation of valves due to the multiple stages. This allows for the system to operate with a minimum of external energy inputs. In a further option, the pressure regulator components can be made at the same time from a single sheet of layered material, it is possible to have a single inlet feeding multiple regulator components with multiple outlets, Methods for use with or for making the above-described device are as follows. For instance, in an option, the method includes a method for forming a fluidic control system, including forming at least one first feature on one or more featured layers, forming at least one second feature on any of the one or more featured layers, and interactively associating the at least one first feature with the at least one second feature and forming at least one functional component. In an option, the method includes interactively associating the at least one first feature with the at least one second feature includes stacking the one or more featured layers, where forming the at least one first feature or the at least one second feature includes etching, stamping, laser cutting, die cutting, deposition, printing, machining, molding, or electroforming a feature on the one or more featured layers.

In a further option, forming at least one functional component includes forming one or more of at least one pressure regulator component, at least one check valve component, at least one flow valve component, at least one conduit component, pressure relief component, or a thermal relief component. In yet another option, forming the at least one featured layer includes forming the at least one featured layer of metal, of elastomeric material, plastic rubber, copper, copper beryllium alloy, aluminum, stainless steel, acrylic, silicon, olefins, epoxies, polyester, brass, PVDF, hexafluoropropylene vinyldyne fluoride copolymer or combinations thereof. The featured layers can be sealed together, where sealing the featured layers includes one or more of gluing, adhesive bonding, thermal bonding, diffusion boding, welding, soldering the featured layers together or combinations thereof.

In yet another option, a method of operating a system includes fluidically coupling a fluid enclosure with a fluidic control system, the fluidic control system including at least one functional component, two or more featured layers having features, and features of any of the two or more featured layers interactively form the at least one functional component, where the method further includes transferring fluid from the fluid enclosure to the fluidic control system. The method optionally includes transferring via a strain relieving interface, and/or transferring fluid from the fluid enclosure to the fluidic control system includes transferring fluid from a fuel cartridge, and/or transferring fluid to at least one fuel cell. In yet a further option, transferring fluid from the fluid enclosure includes transferring fluid via a fluid manifold to the at least one fuel cell, and/or transferring fluid from a fluid plenum of a fuel cell via a fluid manifold to the fluid control system. In a further option, the fluid is transferred based on a fluid flow through a feedback channel of the fluid manifold.

The method further optionally includes fluidly coupling the fluidic control system with a charge port, where optionally, fluidly coupling the fluidic control system with the charge port includes fluidly coupling the fluidic control system with the charge port via a fluid manifold.

The fluidic control system is a layered structure where features of the various layers interact to accomplish functions for the fluidic control system, such as, but not limited to, the functions of a pressure regulator component, a check valve component, a flow valve component, and a fluid conduit. The fluidic control system offers efficient distribution of fluids, for instance in micro fluidic applications. The small scale of the layers allows for multiple identical components to be included, providing for increased reliability and functional flexibility.

In the description of some embodiments of the invention, reference has been made to the accompanying drawings that form a part hereof, and in which are shown, by way of illustration, specific embodiments of the invention that may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the invention. The following detailed description is not to be taken in a limiting sense, and the scope of the invention is defined only by the appended claims, along with the full scope of equivalents to which such claims are entitled.

What is claimed is:

1. A fluidic control system comprising:
    at least one pressure regulator;
    two or more featured layers having features; wherein the features of any of the two or more featured layers interact to collectively form the at least one pressure regulator; the at least one pressure regulator comprises
    a spring-biased valve having a position, wherein a fluid flow through the at least one pressure regulator based on the position of the valve, wherein the spring-biased valve is formed on one of the two or more featured layers, wherein the spring of the spring-biased valve is formed by said one of the two or more featured layers, and
    a flexible feature actuatable in response to a sensory fluid pressure, where the sensory fluid pressure includes a pressure downstream of the valve, and a position of the flexible feature proportionally controls the valve position; and
    wherein the two or more featured layers are stacked and joined together so as to be in fluid communication with one another and to form a gas-tight seal with each other, wherein the spring-biased valve is internal to the gas-tight seal layers.

2. The fluidic control system as recited in claim 1 further comprises an inlet and an outlet.

3. The fluidic control system as recited in claim 1, wherein the spring-biased valve comprises a valve biased by at least one spring.

4. The fluidic control system as recited in claim 1, further comprises a second pressure regulator, wherein the first and second pressure regulators are co-planar with each other.

5. The fluidic control system as recited in claim 1 further comprises a check valve component, a flow valve component, a charge valve component, a pressure relief component, a conduit, or a thermal relief component.

6. The fluidic control system as recited in claim 1, further comprising a sealing layer.

7. The fluidic control system as recited in claim 1, wherein the two or more featured layers include four featured layers.

8. The fluidic control system as recited in claim 1, wherein one or more of the featured layers include a conduit channel, and a featured layer width is greater than about thirty times a conduit channel dimension.

9. A component for a fluidic control system, the component comprising:
    two or more featured layers having features, the features including:
    a spring biased valve having a position, wherein a fluid flows through the component is controllable based on the position of the valve, and wherein the spring-biased valve is formed on one of the two or more featured layers, wherein the spring of the spring-biased valve is formed by said one of the two or more featured layers;
    wherein the component comprises at least one primary pressure regulator and at least one secondary pressure regulator; and
    a flexible feature actuatable in response to a sensory fluid pressure, the sensory fluid pressure includes a pressure downstream of the valve, where a position of the flexible feature proportionally controls the valve position,
    wherein the primary and secondary pressure regulators and the valve are formed by the two or more featured layers and wherein the two or more featured layers are stacked and joined together so as to be in fluid communication with one another and to form a gas-tight seal with each other, wherein the spring-biased valve is internal to the gas-tight seal layers.

10. The component as recited in claim 9, wherein the features include at least two fluid plenums including a first pressure plenum and a second pressure plenum.

11. The component as recited in claim 10, wherein the first pressure plenum is a high pressure plenum receiving unregulated fluid, and the second pressure plenum is a low pressure plenum receiving regulated fluid.

12. The component as recited in claim 11, wherein the sensory fluid pressure includes a pressure in the low pressure plenum.

13. The component as recited in claim 10, wherein the first pressure plenum is a high pressure plenum receiving regulated fluid, and the second pressure plenum is a low pressure plenum receiving unregulated fluid.

14. The component as recited in claim 13, wherein the sensory fluid pressure includes a pressure in the high pressure plenum.

15. The component as recited in claim 10, wherein the flexible feature is integrated with the second pressure plenum.

16. The component as recited in claim 10, wherein a position of the flexible feature proportionally controls the position of the valve, and controls a flow of fluid between the first pressure plenum and the second pressure plenum.

17. The component as recited in claim 9, wherein the flexible feature restricts flow through the component between a predefined range of sensory fluid pressures.

18. The component as recited in claim 9, wherein the flexible feature has elastic properties.

19. The component as recited in claim 9, further comprising a spring member in contact with the flexible feature.

20. A system comprising:
    at least one fluidic control system including:
    at least one functional component and a spring biased valve; and two or more featured layers having features, wherein the spring-biased valve is formed on one of the two or more featured layers, wherein the spring of the spring-biased valve is formed by said one of the two or more featured layers, wherein the features of any of the two or more featured layers collectively form the at least one functional component, the at least one functional component includes at least one primary pressure regulator;

at least one fluid enclosure communicatively coupled with the at least one fluidic control system; and a flexible feature actuatable in response to a sensory fluid pressure, the sensory fluid pressure includes a pressure downstream of the valve, where a position of the flexible feature proportionally controls the valve position wherein the two or more featured layers are stacked and joined together so as to be in fluid communication with one another and to form a gas-tight seal with each other, wherein the spring-biased valve is internal to the gas-tight seal layers.

21. The system as recited in claim 20, wherein a width of a planar portion of the featured layer is greater than about thirty times a thickness of the featured layer.

22. The system as recited in claim 20, wherein one or more of the at least one fluid enclosures are flexible.

23. The system as recited in claim 20, further comprising at least one fuel cell communicatively coupled with the at least one fluidic control system.

24. The system as recited in claim 23, wherein the sensory fluid pressure is a fluid pressure of a fluidic plenum of the at least one fuel cell.

25. A fluidic control system comprising at least one functional component formed by the interaction of features formed in two or more layers, wherein the component's function is achieved by the displacement of at least one feature out of its plane and into the plane of another featured layer, the at least one functional component including a spring biased valve, wherein the spring-biased valve is formed on one of the two or more featured layers, wherein the spring of the spring-biased valve is formed by said one of the two or more featured layers and the at least one functional component including at least one primary pressure regulator; and a flexible feature actuatable in response to a sensory fluid pressure, the sensory fluid pressure includes a pressure downstream of the valve, where a position of the flexible feature proportionally controls a position of the valve, wherein the two or more featured layers are stacked and joined together so as to be in fluid communication with one another and to form a gas-tight seal with each other wherein the spring-biased valve is internal to the gas-tight seal layers.

26. The system as in claim 25, where a moveable feature of any one of the layers is configured to displace out of plane from the any one of the layers such that the moveable feature is displaced through a plane of an adjacent featured layer.

27. A fluidic control system, wherein a fluid is conducted through and is controlled by the fluidic control system, said fluid control system comprising:

a plurality of layers stacked on each other and joined to form a gas-tight single unit, and a first pressure regulator formed by at least some of said plurality of layers and wherein the pressure regulator comprises a flexible membrane formed by one of said plurality of layers and a spring biased valve member formed on another of said plurality of layers, wherein the spring of the spring-biased valve is formed by said another of said plurality of layers, and wherein the pressure regulator is actuated in part by a pressure of said fluid, and wherein the spring-biased valve is internal to the gas-tight single unit.

28. The fluidic control system of claim 27, wherein the pressure regulator comprises a high pressure fluid plenum formed by at least some of said plurality of layers.

29. The fluidic control system of claim 27, wherein the pressure regulator comprises a low pressure fluid plenum formed in part by the flexible membrane.

30. The fluidic control system of claim 29, wherein the pressure of said fluid in the low pressure fluid plenum partially actuates the pressure regulator.

31. The fluidic control system of claim 30, wherein when the fluid pressure in the low pressure fluid plenum is above a predetermined level, the membrane flexes outward and the spring biased valve member is urged to a closed position to close the pressure actuator and when the fluid pressure in the flow pressure fluid plenum is below a predetermined level, the membrane moves in the opposite direction and the spring biased valve member is urged to an open position to open the pressure regulator.

32. The fluidic control system of claim 31, wherein the valve member is biased by at least one spring formed in said another of said plurality of layers.

33. The fluidic control system of claim 27 further comprising a second pressure regulator by said plurality of layers.

34. The fluidic control system of claim 33, wherein the pressure regulator and the second pressure regulator are coplanar.

35. The fluidic control system of claim 27 further comprising a check valve formed by said plurality of layers.

36. The fluidic control system of claim 35, wherein the check valve comprises an inlet, an outlet and an elastomeric sealing member disposed therebetween, wherein the elastomeric member elastically deforms in response to pressure to open the check valve.

37. The fluidic control system of claim 27 further comprising a flow valve formed by said plurality of layers.

* * * * *